Jan. 17, 1967 J. S. YOUNG 3,299,213

TRUNK SELECTION ARRANGEMENT FOR A LINE CONCENTRATOR SYSTEM

Filed Nov. 5, 1963 18 Sheets-Sheet 1

INVENTOR.

JOHN S. YOUNG

BY

ATTY.

TRUNK SELECTION ARRANGEMENT FOR A LINE CONCENTRATOR SYSTEM

Filed Nov. 5, 1963 18 Sheets-Sheet 2

Jan. 17, 1967 J. S. YOUNG 3,299,213

TRUNK SELECTION ARRANGEMENT FOR A LINE CONCENTRATOR SYSTEM

Filed Nov. 5, 1963

18 Sheets-Sheet 4

Jan. 17, 1967 J. S. YOUNG 3,299,213

TRUNK SELECTION ARRANGEMENT FOR A LINE CONCENTRATOR SYSTEM

Filed Nov. 5, 1963 18 Sheets-Sheet 7

Jan. 17, 1967 J. S. YOUNG 3,299,213

TRUNK SELECTION ARRANGEMENT FOR A LINE CONCENTRATOR SYSTEM

Filed Nov. 5, 1963 18 Sheets-Sheet 8

Jan. 17, 1967 J. S. YOUNG 3,299,213

TRUNK SELECTION ARRANGEMENT FOR A LINE CONCENTRATOR SYSTEM

Filed Nov. 5, 1963 18 Sheets-Sheet 9

Jan. 17, 1967 J. S. YOUNG 3,299,213

TRUNK SELECTION ARRANGEMENT FOR A LINE CONCENTRATOR SYSTEM

Filed Nov. 5, 1963 18 Sheets-Sheet 12

United States Patent Office 3,299,213

Patented Jan. 17, 1967

3,299,213

TRUNK SELECTION ARRANGEMENT FOR A LINE CONCENTRATOR SYSTEM

John S. Young, Addison, Ill., assignor to Automatic Electric Laboratories, Inc., Northlake, Ill., a corporation of Delaware Filed Nov. 5, 1963, Ser. No. 321,623
4 Claims. (Cl. 179—18)

This invention relates to data communication systems wherein a plurality of subscribers share a lesser plurality of trunks for connection to a central office, and more particularly to the convergent network through which the lines which emanate from the subscriber stations are coupled to a smaller number of trunks at the remote concentrator unit, and to the divergent network at the central office through which the trunks are re-expanded to an equal number of subscriber line terminations.

It is a general object of this invention to provide an improved communication system wherein a large number of lines may be connected to a central office by a small number of trunks.

It is another object of this invention to provide an improved system wherein a number of subscriber lines may be connected by a plurality of first crosspoints to a lesser number of trunks, which in turn are connected to a second plurality of crosspoints to an equivalent number of line circuits at the central office.

The disclosed circuit provides for serving up to 10 station lines via a maximum of 5 trunks. All control functions are via the working or call handling trunks; no separate control trunk is required.

Each remote station requires line equipment at the central office.

The wire transmission facility is switched through a 10×5 crosspoint matrix at the remote location, and also at the central office in order to effect the concentration of 10 lines to 5 trunks at each end of the system.

A common relay group at each end controls the matrix. In the quiescent condition each marker has pre-allotted an idle trunk; synchronizing means are provided so that the same trunk is allotted at each end. An originating call causes the remote marker to outpulse a single digit corresponding to the number of the calling line. This digit is received by the marker at the central office end. When the calling line identity has been transmitted, the matrices are switched and the next idle trunk allotted in preparation for the next call.

Terminating calls are treated in a similar manner, and the identification digit is transmitted from the central office to the remote location.

Means are provided to place the remote line in lock-out and free the trunk circuit in response to a lock-out indication at the central office line equipment.

In the exemplary embodiment set forth herein the crosspoint relays are so called reed relays wherein the contacts are sealed in glass envelopes with the relay winding wound around all of the envelopes of the contacts comprising the relay. A typical reed type relay is disclosed in the copending application of George S. Lychyk and Arvo Taliste filed July 28, 1961, Serial No. 127,648, granted April 7, 1964, as U.S. Patent No. 3,128,356. The matrix arrangements of these relays is disclosed in the copending application of Peter K. Gerlach, George J. David and Rudolph O. Stoehr filed August 21, 1961, Serial No. 132,897, granted July 6, 1965, as U.S. Patent No. 3,193,731, while the overall system with which this disclosure is arranged to operate is disclosed in the copending application of Frank B. Sikorski and Kore K. Spellnes filed December 12, 1962, Serial No. 244,058, granted December 28, 1965, as U.S. Patent No. 3,226,488.

A feature of this invention is the use of all of the trunks for the handling of calls without requiring separate control facilities.

Another feature of this invention is that the concentrator calling line number is pulsed from the calling end to the called end prior to completing the connection through the concentrator system.

Still another feature of this invention is that the calling line number is pulsed out simultaneously with the scanning of the calling line group.

The foregoing and other objects and features of this invention and the manner of attaining them will become more apparent and the invention will best be understood, by reference to the following description of an embodiment of the invention taken in conjunction with the accompanying drawings, comprising FIGS. 1 to 20, wherein:

FIGS. 1 to 4 disclose the circuit of the remote end concentrator common marker.

FIG. 5 discloses a concentrator trunk circuit for the remote end.

FIG. 6 discloses a concentrator trunk circuit for the central office end.

FIGS. 7 to 10 disclose the circuit of the central office end concentrator common marker.

FIG. 11 discloses the remote end subscriber line circuit.

FIG. 12 discloses the subscriber line and line termination relays.

GENERAL

Figure 1:
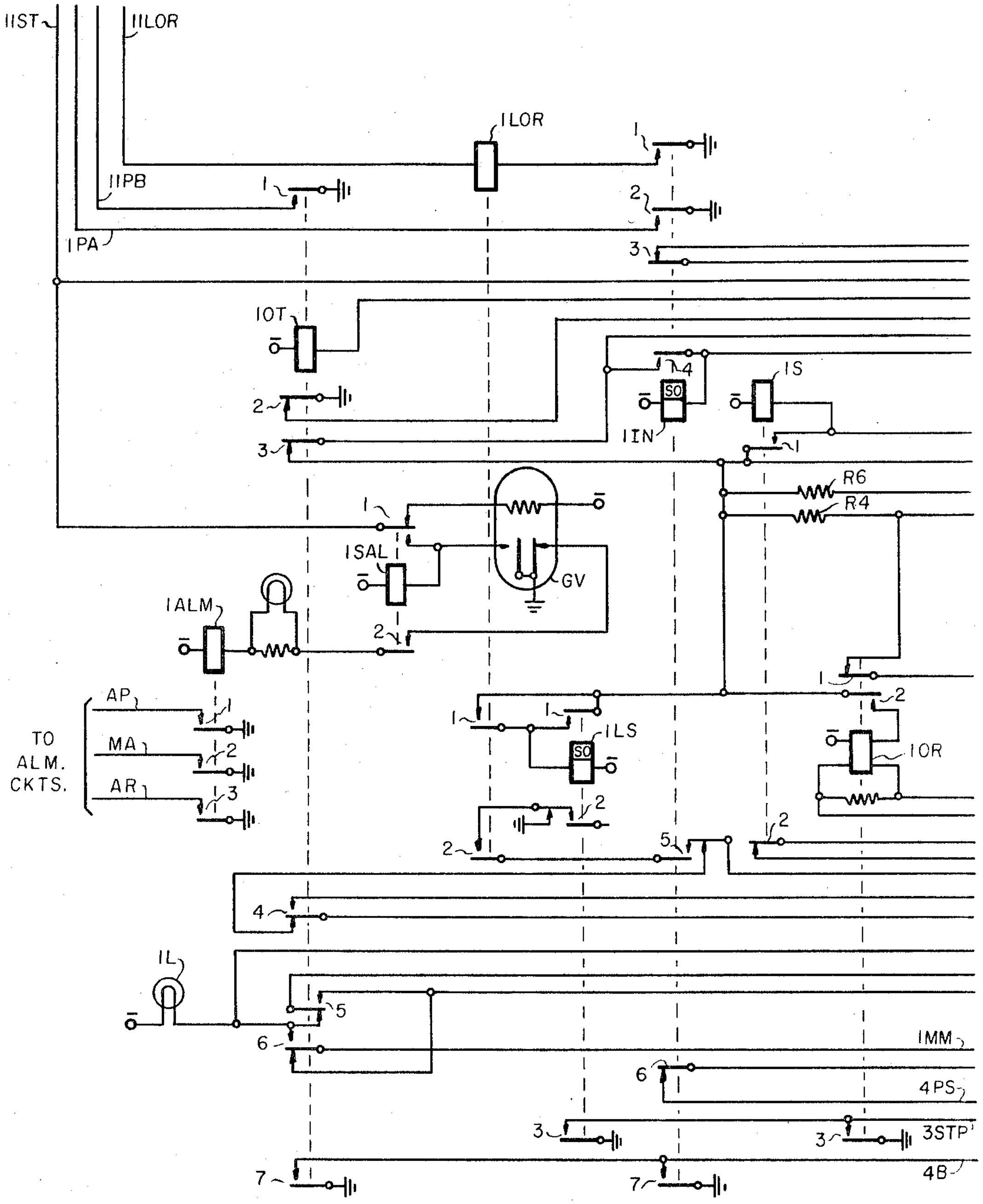
Figure 2:
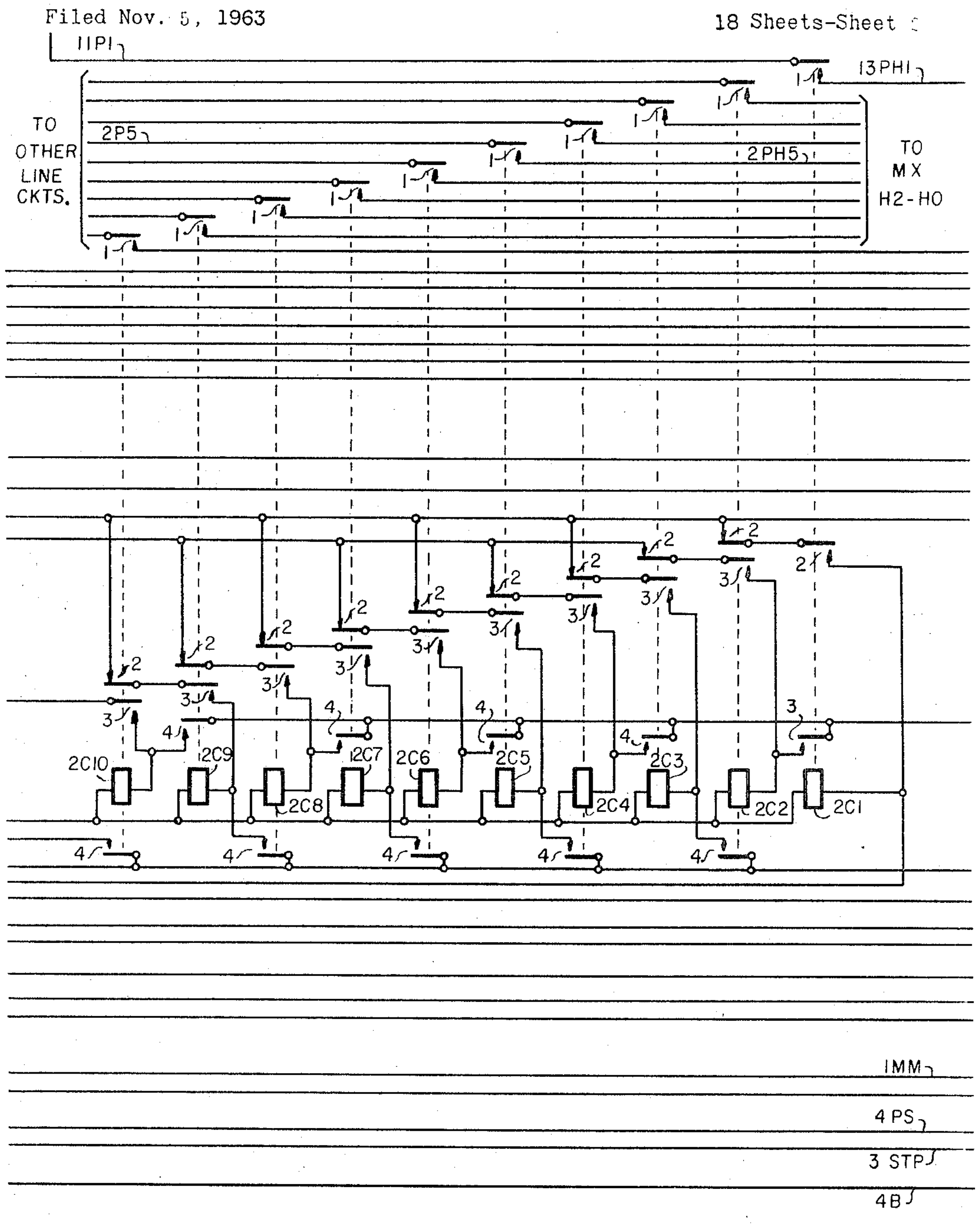
Figure 3:
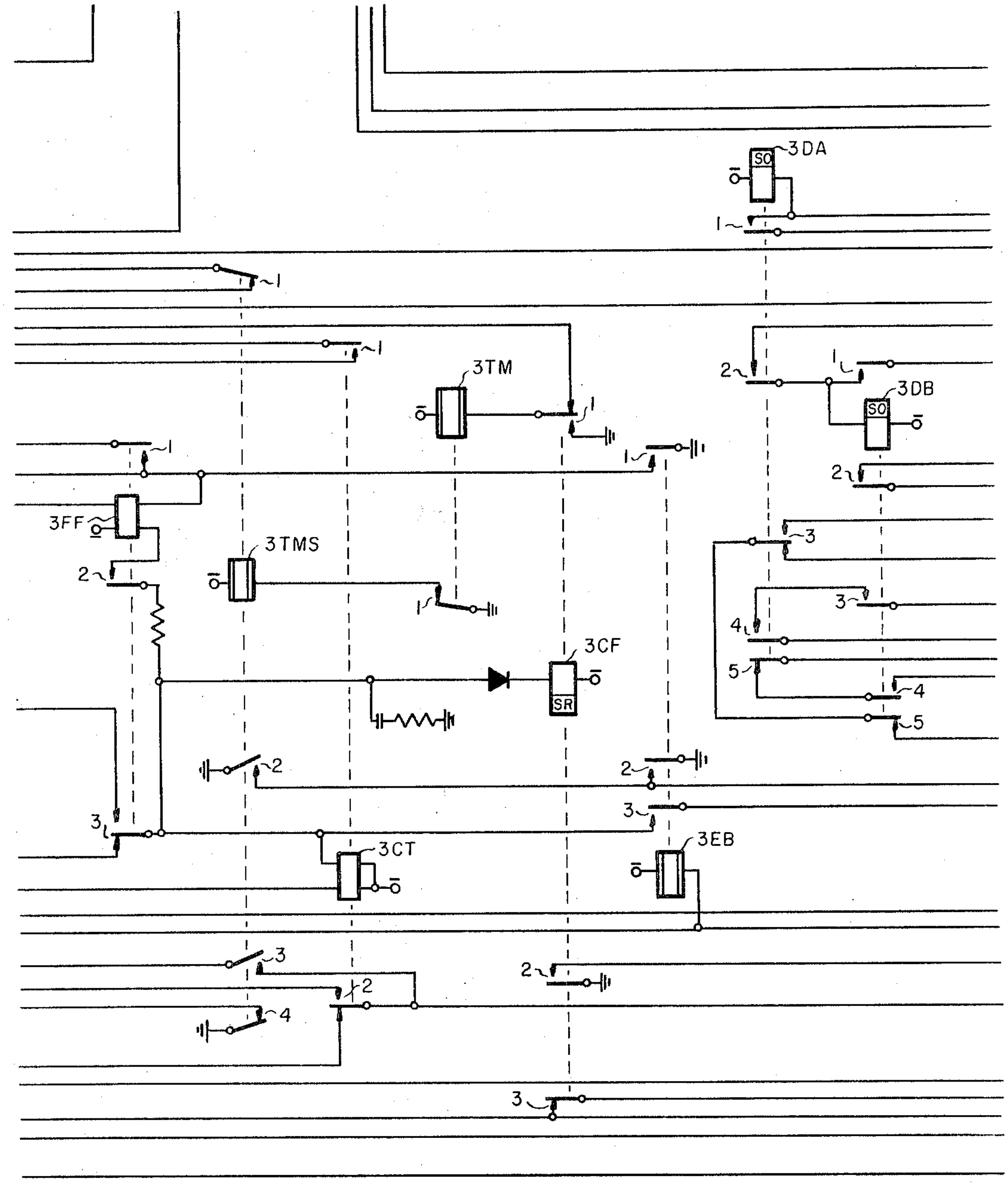
Figure 4:
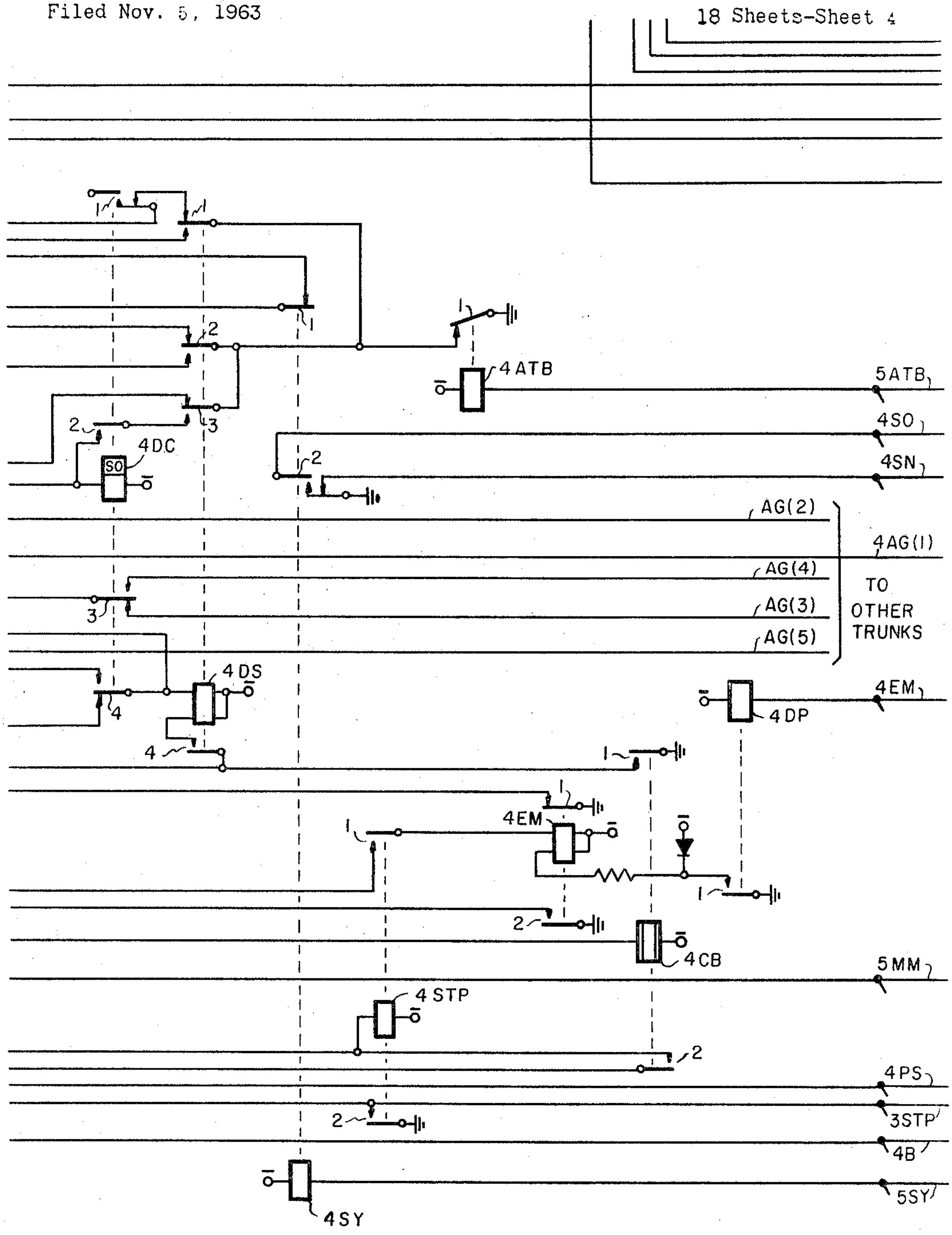
Figure 5:
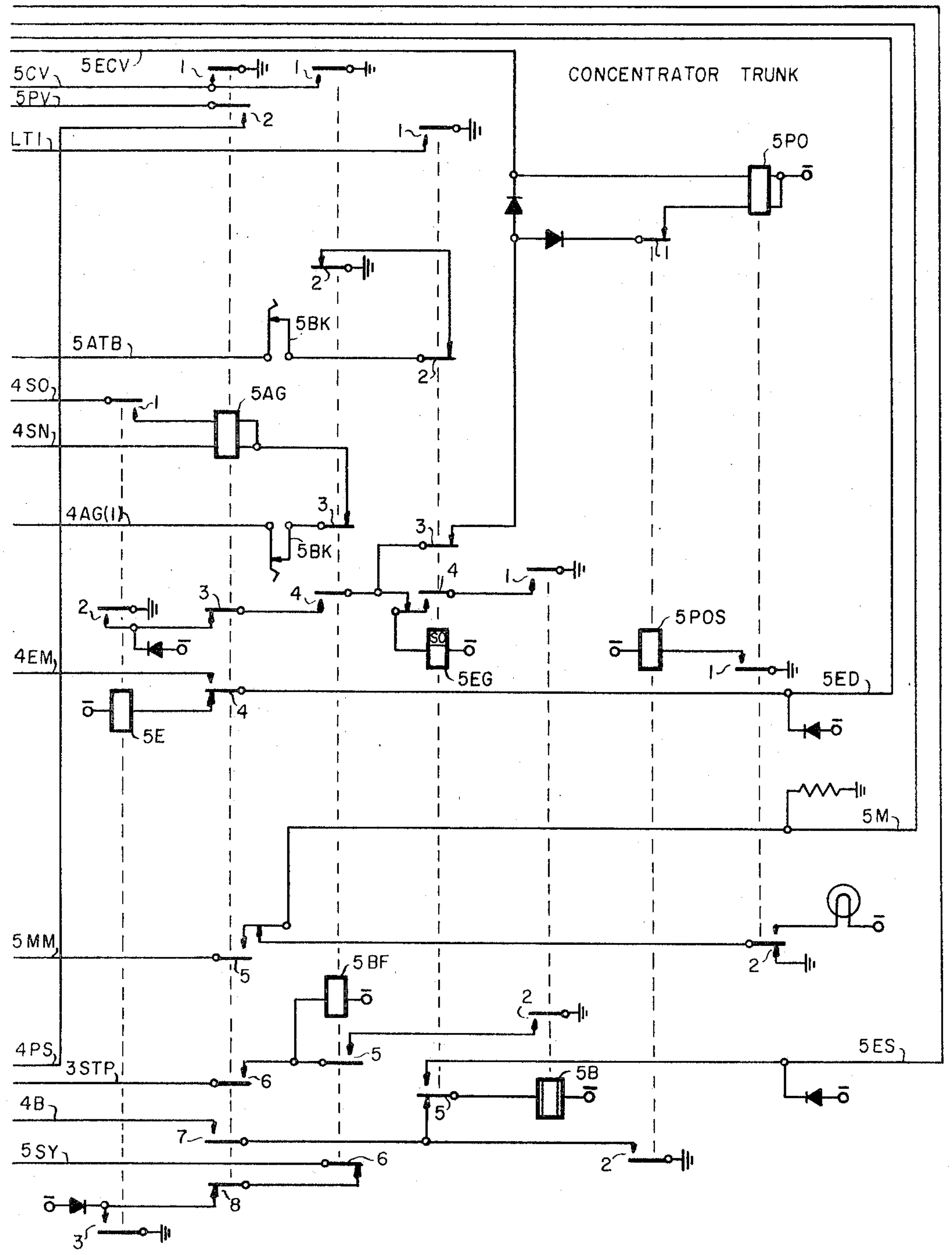
Figure 6:
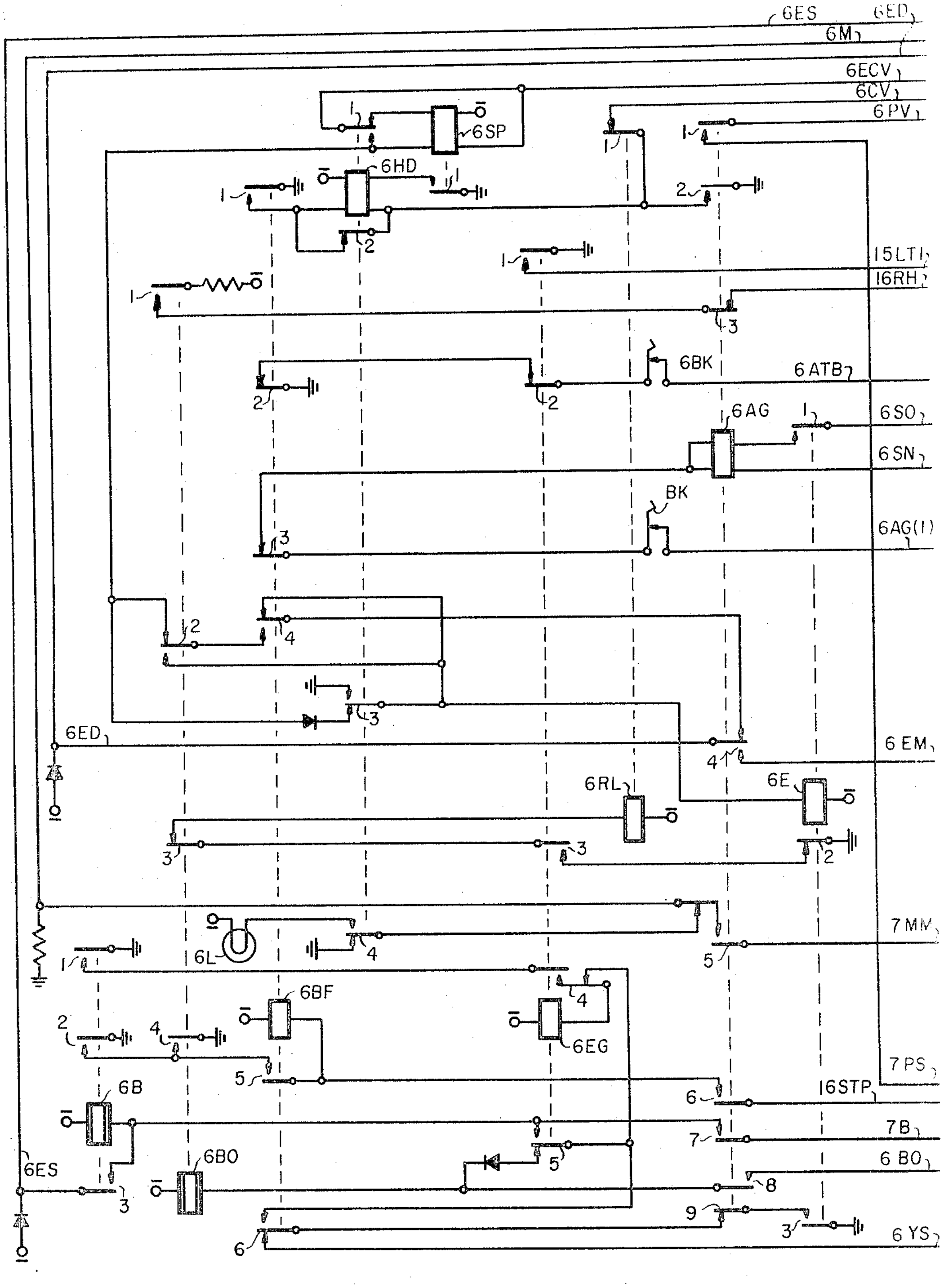
Figure 7:
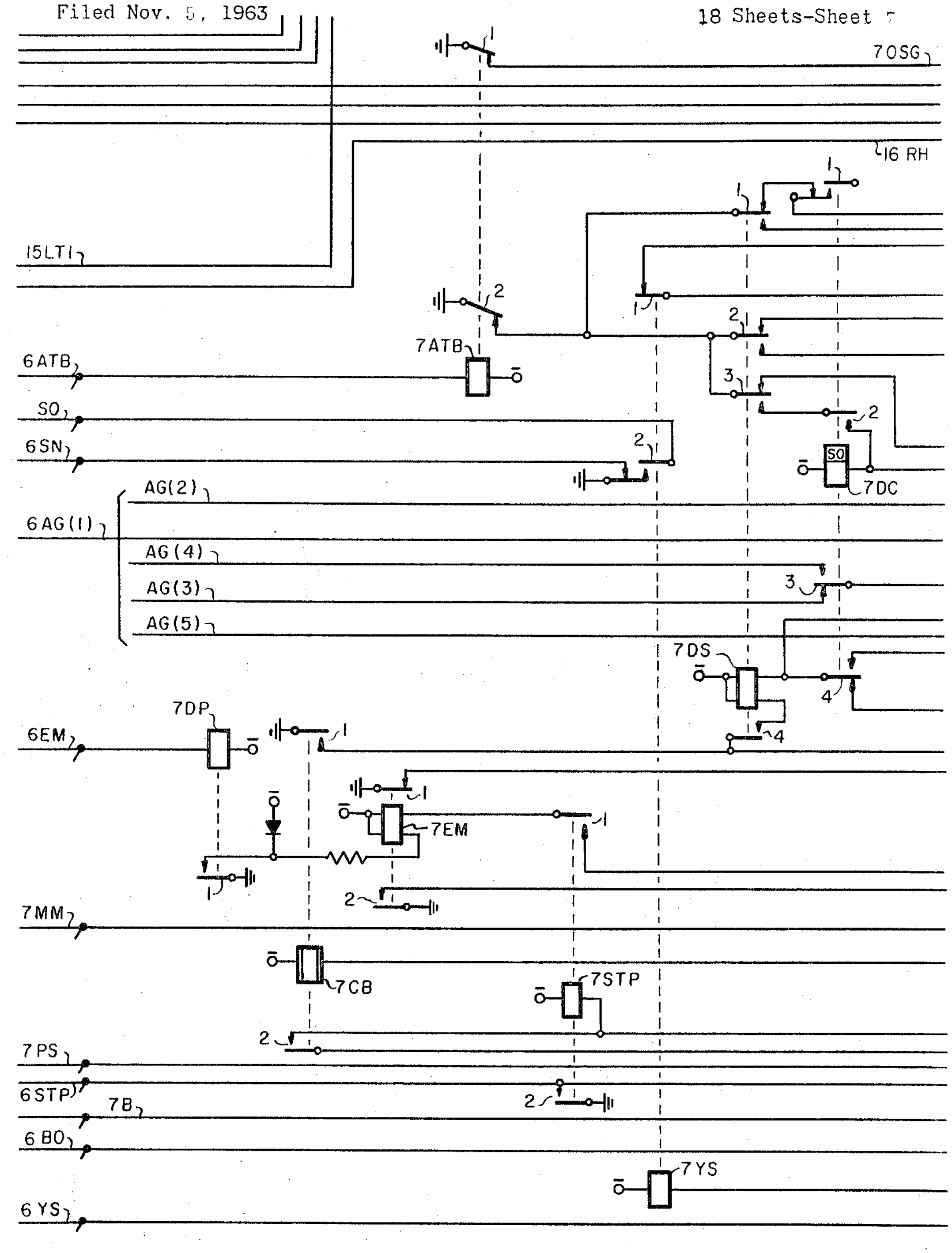
Figure 8:
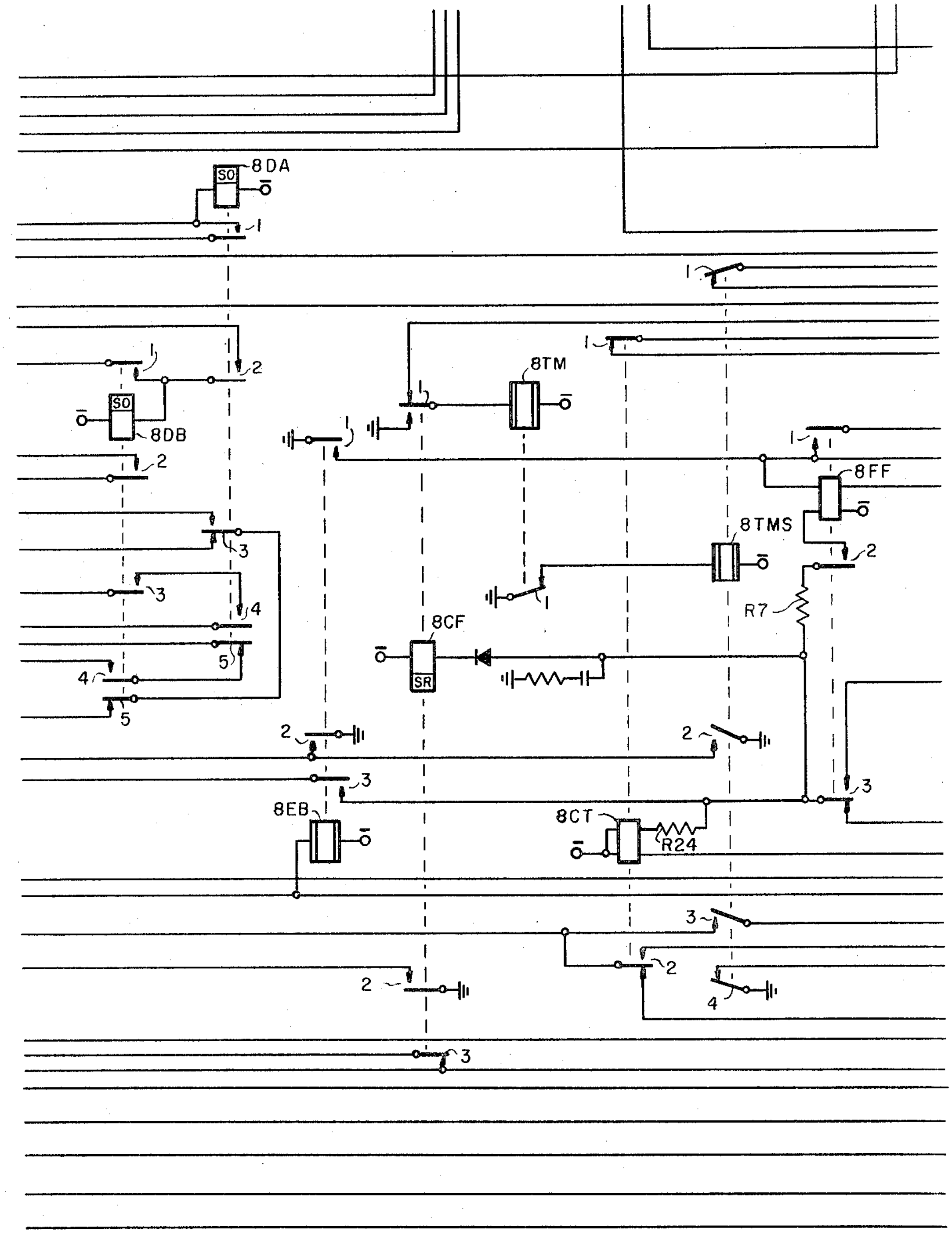
Figure 9:
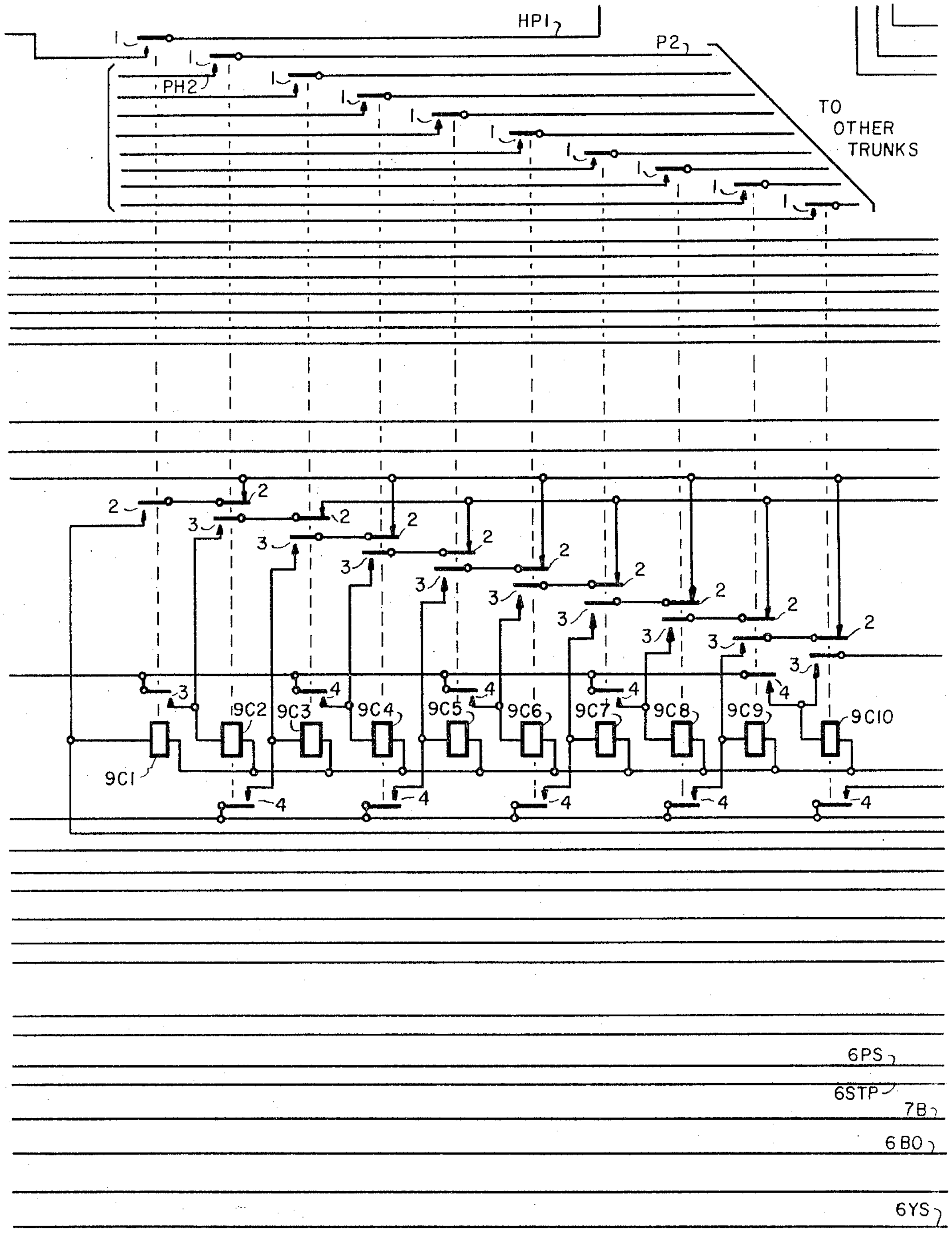
Figure 10:
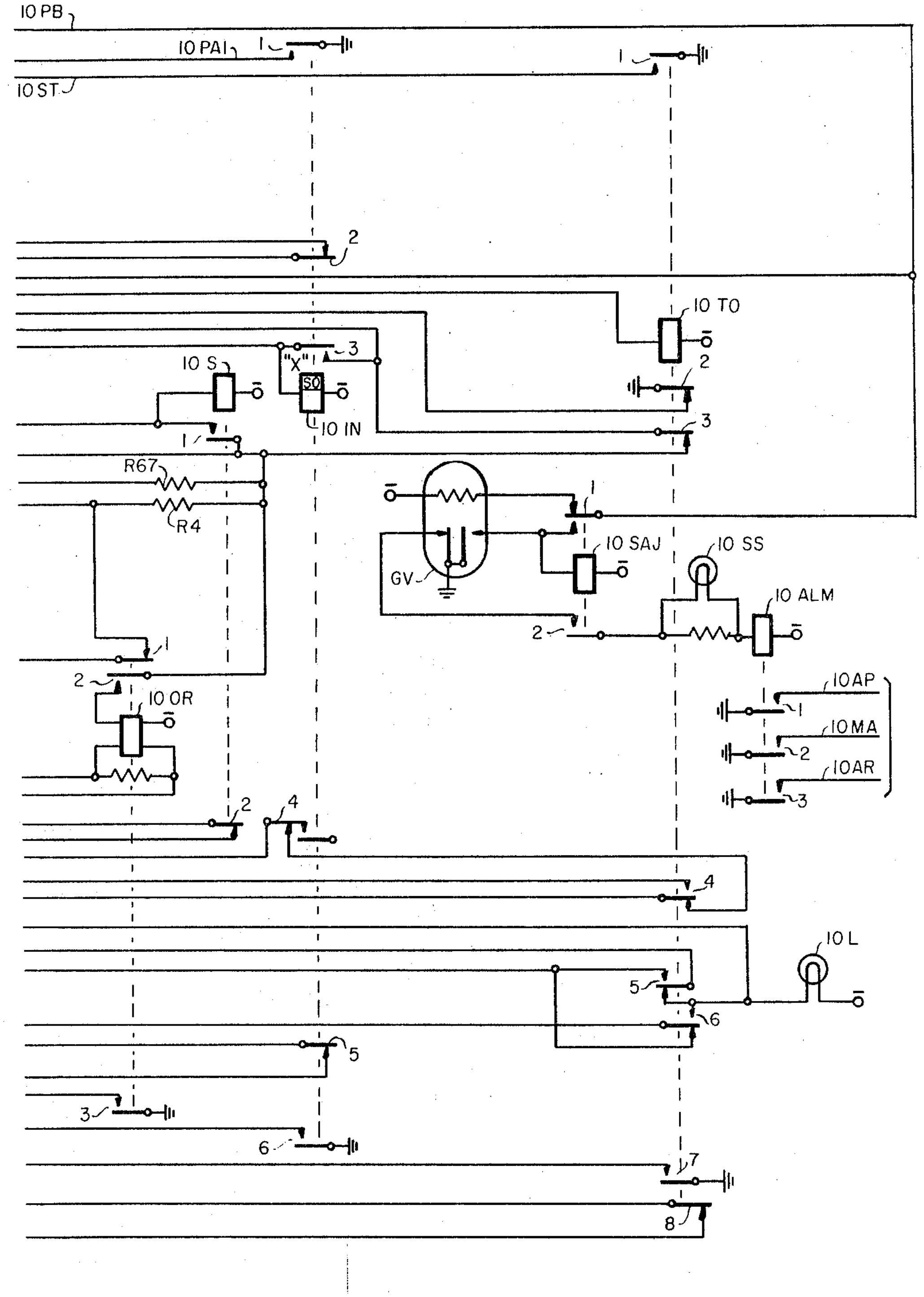
Figure 11:
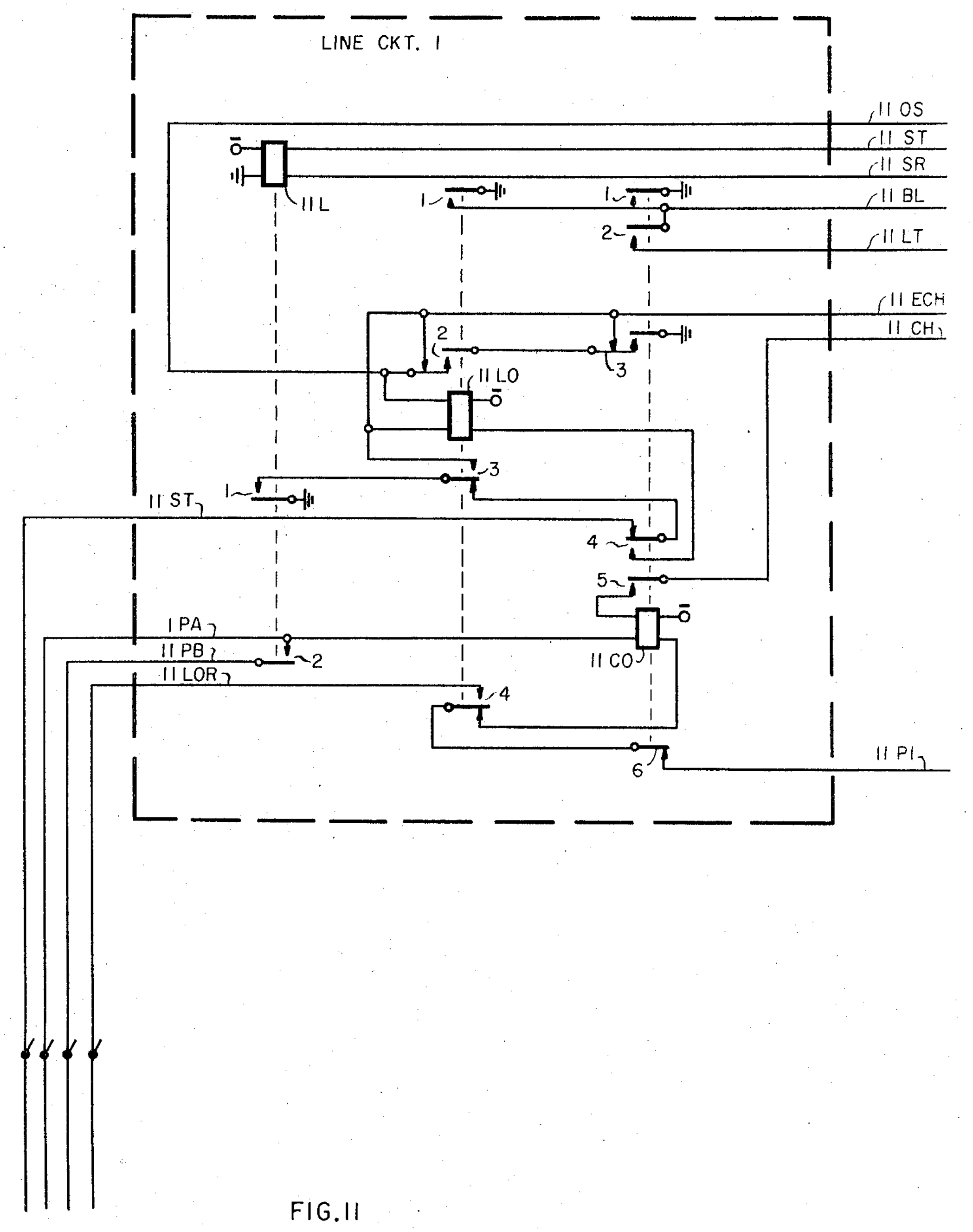
Figure 12:
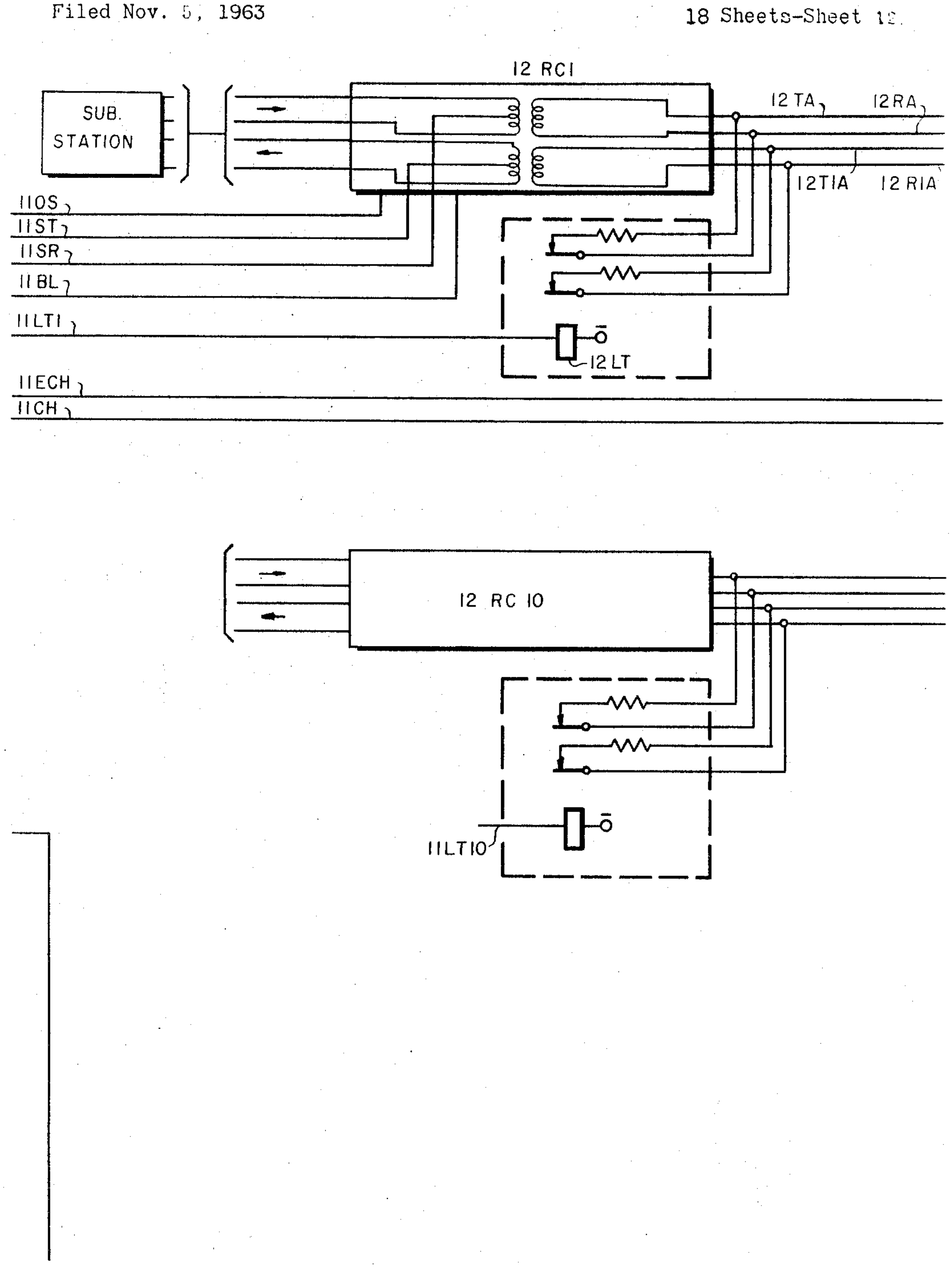

Each station line is provided with a line equipment at the remote location, and also with a regular line circuit at the central office. The central office may be of the general type disclosed in the copending application of Ivan V. Coleman, Lester L. Smith and Willard A. Rust filed October 24, 1963, Serial No. 318,646. In order that the central office line circuit may be assigned among any of the universal 16KC equipments, an adapter is provided to associate the regular line to the special requirements of the concentrator. The adapter is mounted as part of the concentrator.

Each trunk requires a relay group at the remote location and at the central office. A 10×5 crosspoint matrix is provided at each end to switch connections between lines and trunks.

Control of switching functions is provided by a common relay group which may be called a marker. The same concentrator marker is used at both the remote and central office locations.

Concentrator operation requires that a line requiring originating or terminating service be switched to an idle trunk at each end of the system. Normally, each marker will pre-allot the same idle trunk. Assuming an originating call, the operation is as follows:

The remote line relay operates to close a start signal to the marker, which in turn closes an off-hook to the central office. If the central office concentrator marker is associated with the selected trunk as it should be, a wink signal is returned to the remote location to indicate that call set-up may proceed. If the central office marker is not associated with the selected trunk, a relay finder in the marker finds the calling trunk, after which the wink is returned.

The remote marker steps a relay scanner to look for the calling line. At the first step, a pulse (on-hook) is transmitted to the central office. When this is registered in the central office marker, an off-hook is returned, causing the remote scanner to take another step. This sequence is repeated until the calling line is found.

In this manner, an interlocked or revertively pulsed digit transmits calling number information to the central office. The matrices are switched when this operation is completed, and the markers disassociated themselves from the trunk. When the central office equipment is ready to receive address information, off-hook and dial tone will be returned. The off-hook will be maintained for the duration of the call; an on-hook will cause the remote line equipment to go into lock-out, releasing the trunk. Supervisory information (including dial pulses) is via lead EC through the matrices. The circuit is arranged for the EC lead to be used for two-way supervision.

Terminating calls are set up in the same manner as originating, except that the central office concentrator marker performs the scanning operation. An additional factor on terminating calls is that if the remote line is in lock-out, it will test idle at the central office termination since no trunk is held in this case. Accordingly, when the central office equipment switches a call to a concentrator line, an immediate hold is returned to prevent the central office connector from ringing while the call is being set up to the remote location. If the called line tests idle at the remote location, the hold is removed and ringing proceeds in the normal manner, but if a lock-out condition is found, this is signalled back to the central office via a flash. The central office line e.g. adapter then goes into the equivalent of lock-out, releases the trunk, trips the ring in the connector without answer supervision, and returns busy tone to the calling party.

If an originating and terminating call seizes the respective markers simultaneously, a time-out at the remote location gives preference to the terminating call.

A time-out on start signals provides an alarm if service is not obtained through the concentrator within 10 seconds.

The design provides that a 48 volt power supply is required at the remote location, but not tone or ringing equipment.

*Call from the remote end*

*Pre-Seizure.*—Assume the first high-usage trunk is pre-allotted, then the following relays are operated at the remote and central office ends of the concentrator respectively; 3TM, 3TMS, 4ATB, 4DS, 5AG, and 8TM, 8TMS, 7ATB, 7DS and 6AG. The manner in which these relays are operated in explained in the section titled "Trunk Pre-Allotting."

*Seizure.*—(Operated: Relays 3TM, 3TMS, 4ATB, 4DS, 5AG and 6AG)

When the subscriber is "off hook," the circuit to relay is closed over the simplex loop shown in 12RC. Relay 11L operates, closes lead 11PB via the second winding of relay 11CO to lead 11P1, and grounds lead 11ST to close a circuit to relay 1OT and thermal delay relay 1GV. Relay 1OT operates, grounds lead 11PB to mark the line requesting service, opens the circuit of relay 3TM, transfers lead 1MM from ground to resistance 1L battery, and grounds at contacts 10T7 a lead to close a circuit to relay 5B. Relay 5B operates.

Resistance battery on lead 5M is converted to ground by the signal equipment; this ground is applied to leads 6ED and 6ES at the central office end.

If the central office concentrator marker is associated with the selected trunk (as it should be), ground on lead 6ED at the central office end of the concentrator is extended to relay 7DP via lead 6EM. Correed 7DP at the central office end operates and closes a circuit to the first winding of relay 7EM. Relay 7EM operates and closes circuits to relay 8EB and the second winding of relay 8CT in multiple. Relay 8CT operates and transfers lead 7MM from ground to resistance 10L battery. Relay 8EB operates, closes a circuit to the second winding of relay 7DS, and closes a circuit to relay 10IN. Battery on lead 6M at the central office end of the concentrator is converted to ground by the signal equipment and applied to leads 5ED and 5ES at the remote end.

Ground on lead 5ED extends to lead 4EM and closes a circuit to relay 4DP. Correed 4DP operates and closes a circuit to the first winding of relay 4EM. Relay 4EM operates and closes a circuit to relay 3EB. Relay 3EB operates and closes a circuit to the second winding of relay 4DS.

After its slow to operate interval relay 10IN, at the central office end, operates its X contacts 10IN3, locks, operates fully, opens the circuit to the second winding of relay 8CT, closes a circuit to relay 6B via ground on lead 7B, and grounds leads 10PA1–10. Relay 8CT restores and transfers lead 7MM from resistance battery to ground. Relay 6B operates and locks to ground on lead 6ES.

*Finding the Calling Line.*—(Operated: Relays at both ends 3TM, 8TM, 4ATB, 7ATB, 4DS, 7DS, 5AG, 6AG, 5B, 6B, 4DP, 7DP, 4EM, 7EM, 3EB, 8EB; at the remote end 11L and 1OT; and at the central office end 10IN).

Figure 13:
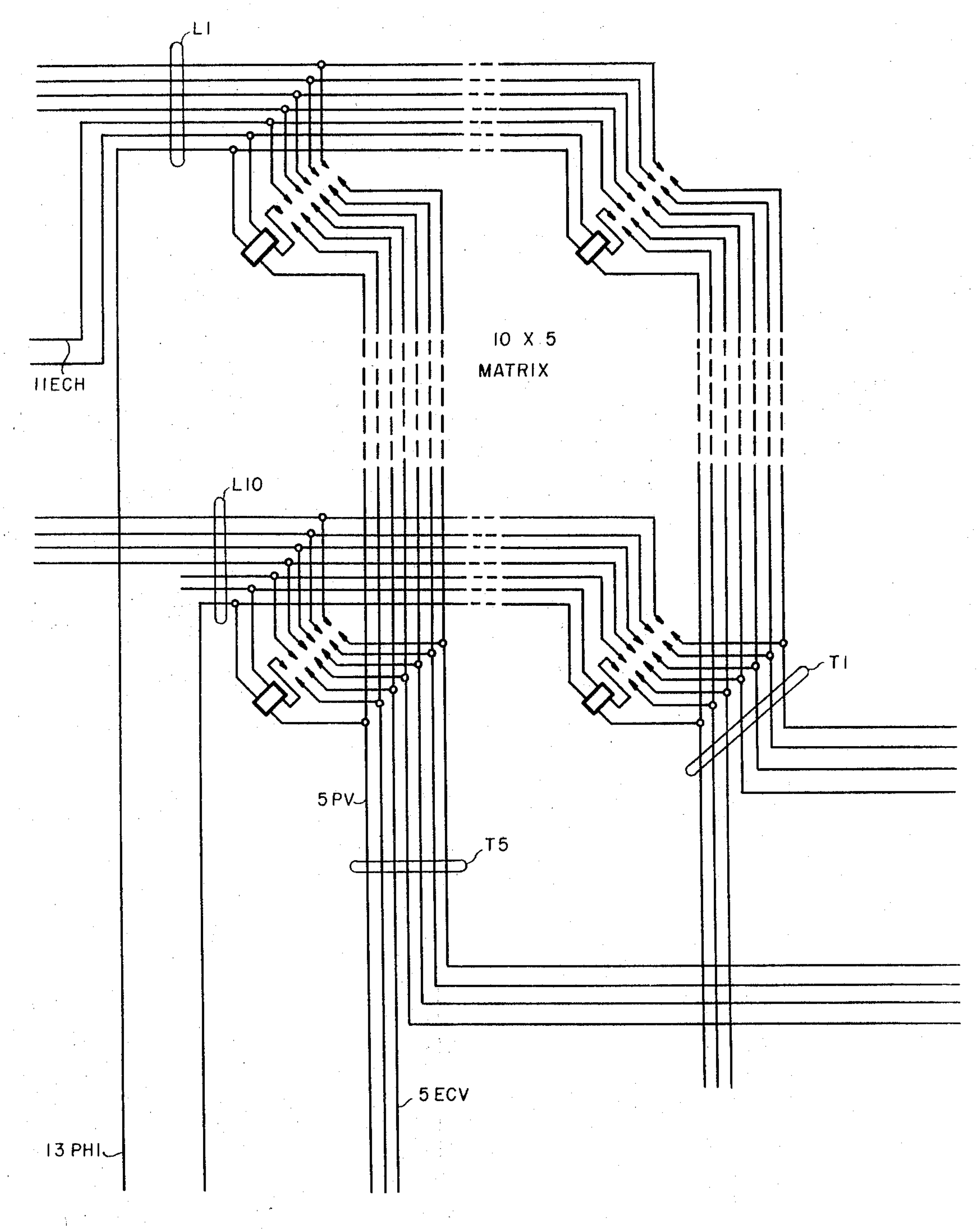
FIG. 13 shows in abbreviated form the crosspoint switching matrix for the remote end.
Figure 14:
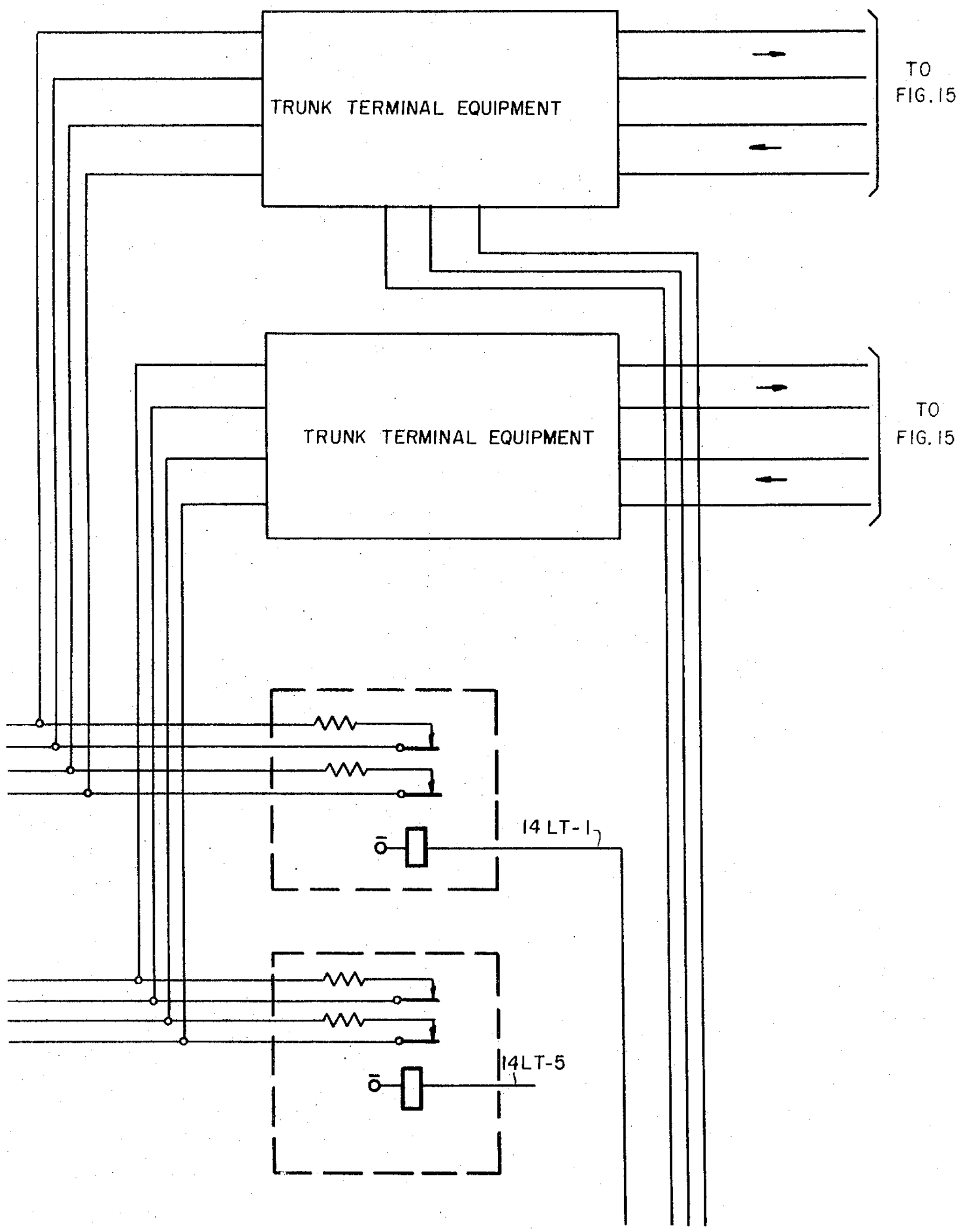
FIG. 14 shows the remote end trunk terminal equipment and the line termination relays connected at the trunk side of the matrix.
Figure 15:
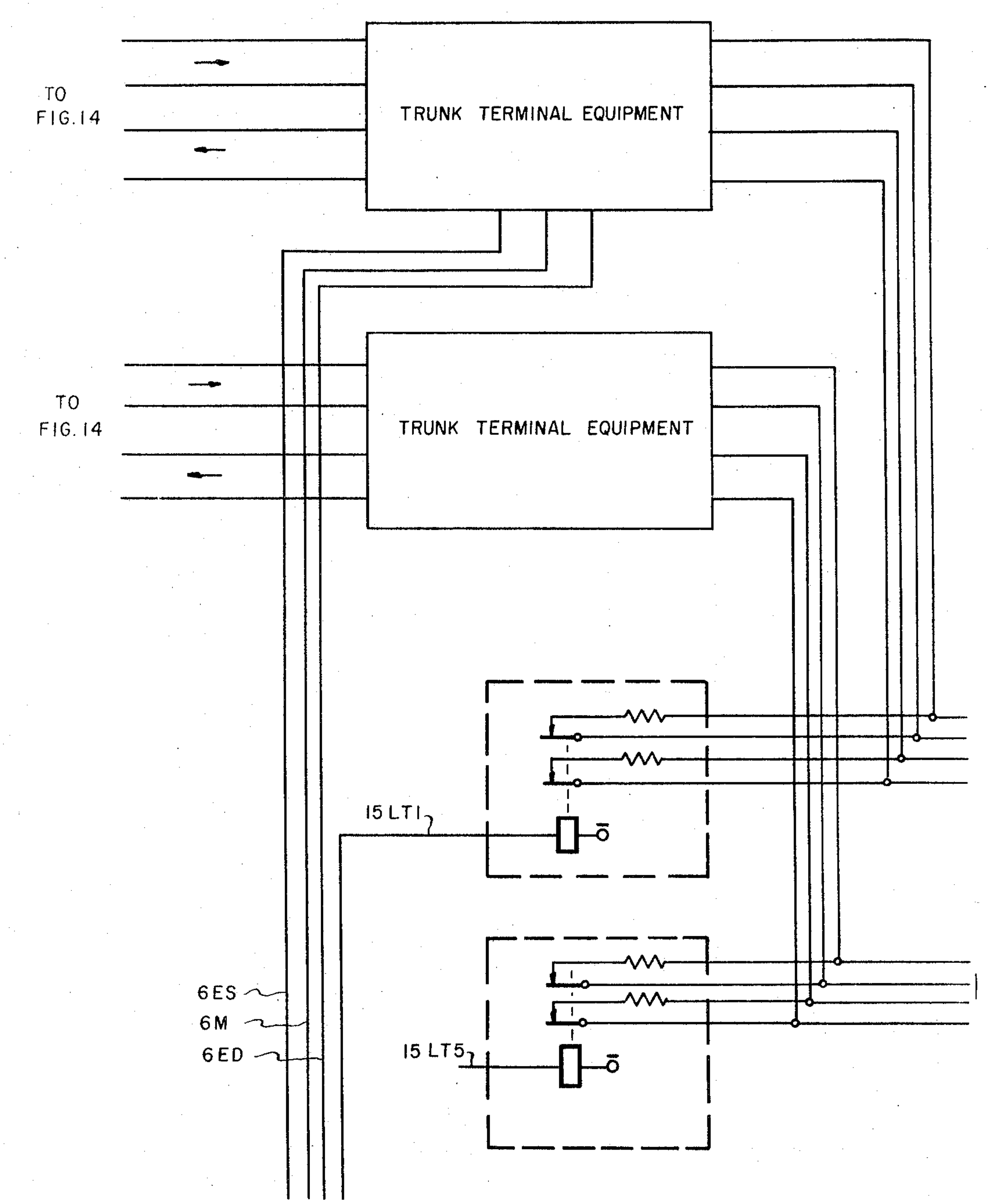
FIG. 15 shows the central office end trunk terminal equipment and the line termination relays connected at the trunk side of the central office concentrator matrix.
Figure 16:
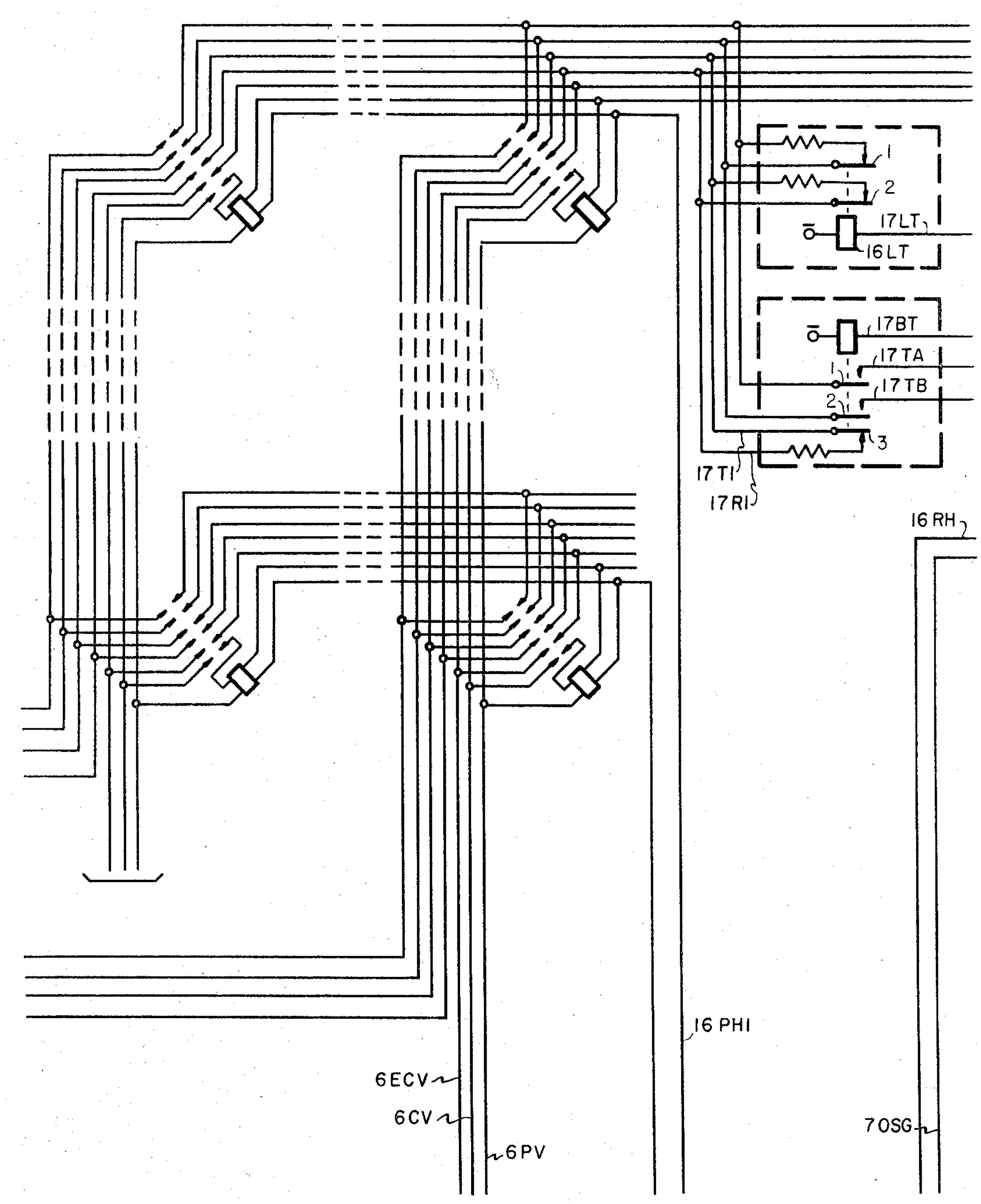
FIG. 16 shows in abbreviated form the crosspoint switching matrix at the central office end, and also the line termination equipment.
Figure 17:
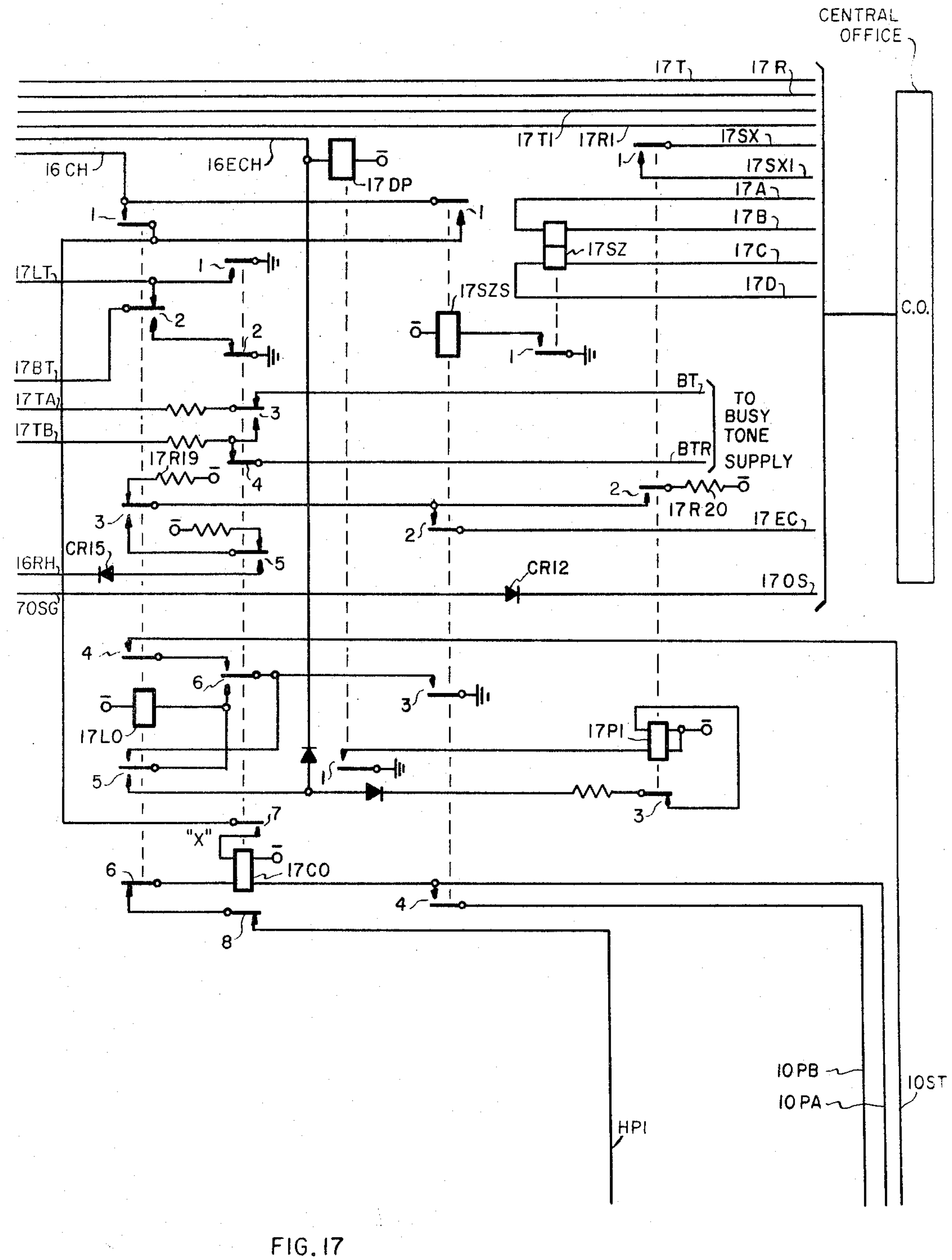
FIG. 17 shows the line circuit adapter for the central office end of the concentrator.
Figure 18:
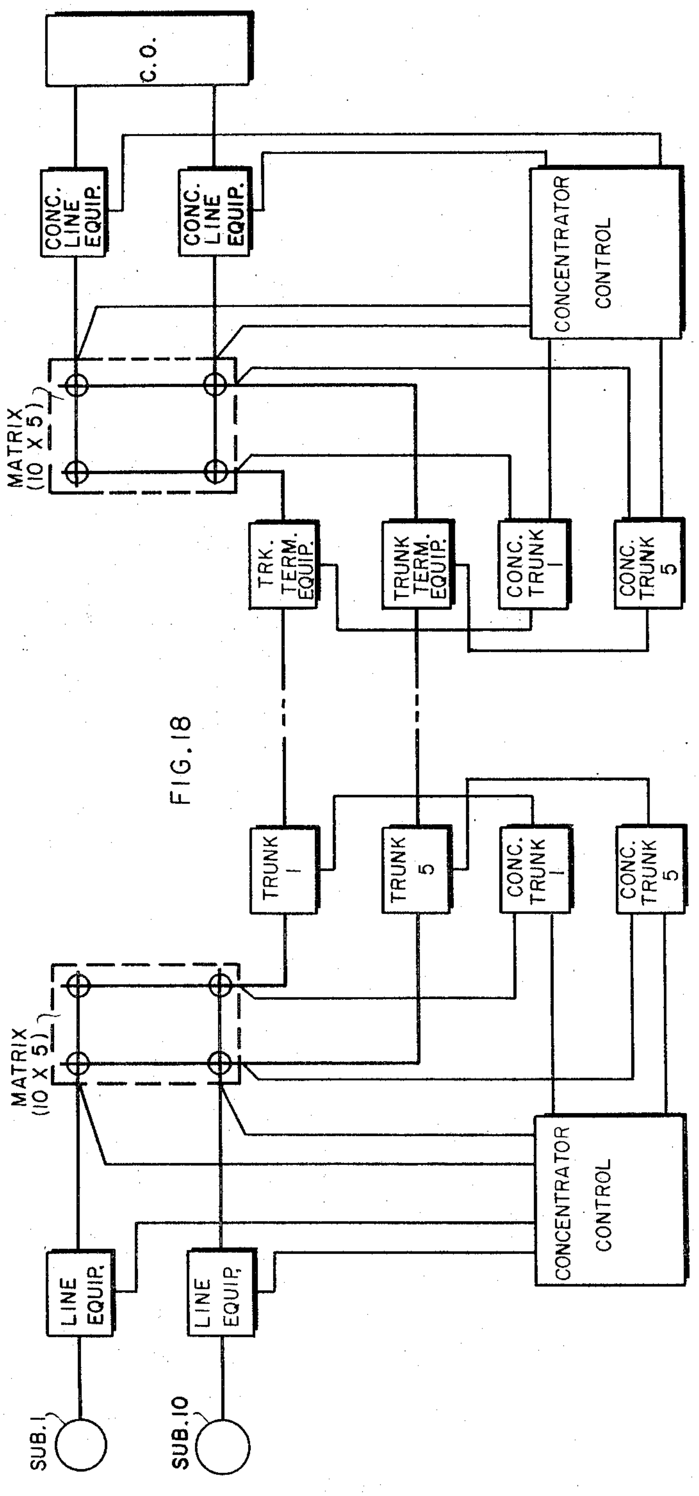
FIG. 18 is a block diagram of the system.
Figure 20:
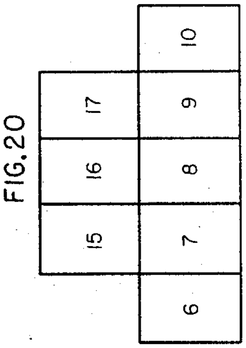
FIGS. 19 and 20 show how FIGS. 1–17 should be arranged to form a unitary disclosure.
Figure 19:
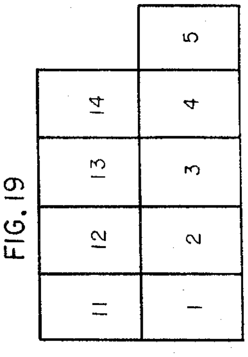

Ground on lead 7MM at the central office end is extended to lead 6M. This ground is converted to battery by the signal equipment and applied to leads 5ED and 5ES of the remote concentrator trunk short circuiting relay 4DP; correed 4DP restores and opens the circuit to the first winding of relay 4EM. Relay 4EM restores, opens the circuit of relay 3EB, closes circuits to the first winding of relay 3CT and relay 2CI in series, and closes a circuit to relay 3CF. Relay 3EB remains operated due to its slow to release characteristic. Relay 3CF operates, closes a circuit to relay 4CB, and recloses the circuit of relay 3TM before it restores to stop timing. Relay 3CT operates and transfers lead 5MM from resistance 1L battery to ground. Relay 2CI operates, locks, shunts the second winding of relay 3FF, and closes lead 11P1 from the line circuit to lead PH of the first horizontal level of the remote switching matrix FIG. 13. Relay 4CB operates and closes a circuit to the second wniding of relay 4DS.

Ground on lead 5MM is extended to the signal equipment, converted to battery and applied to leads 6ED and 6ES of the concentrator trunk at the central office end to short circuit 7DP and 6B, respectively. Correed 7DP restores and opens the circuit to the first winding of relay 7EM. Relay 7EM restores, opens the circuit to relay 8EB, closes circuits to the first winding of relay 3CT, 8CT and 9CI in series, and closes a circuit to relay 8CF. Relay 8CF operates, closes a circuit to relay 7CB, and recloses the circuit to relay 8TM before it restores to stop timing. Relay 8CT operates and transfers lead 7MM from ground to resistance 10L battery. Relay 9CI operates, locks, shunts the second winding of relay 8FF, and closes lead 17P1 from the line equipment adapter to lead 16PH1 of the first horizontal level of the central office switching matrix. Relay 7CB operates and closes a circuit to the second winding of relay 7DS.

The resistance battery on lead 7MM is extended to the signal equipment, converted to ground and applied to leads 5ED and 5ES at the remote end to close a circuit to relay 4DP. Correed 4DP operates and closes a circuit to the first winding of relay 4EM. Relay 4EM operates, recloses a circuit to relay 3EB (before it restores), opens the circuit to relay 3CF, opens the circuit to the first winding of relay 3CT, and removes the shunt from the second winding of relay 3FF. Relay 3FF operates and closes a circuit to relay 1S. Relay 1S operates and locks. Relay 3CT restores and transfers lead 5MM from ground to resistance battery.

The resistance battery on lead 5MM is extended to lead 5M of the signal equipment, converted to ground and applied to leads 6ED and 6ES at the central office end to close circuits to relays 7DP and 5B, respectively. Correed 7DP operates and closes a circuit to relay 7EM. Relay 7EM operates, recloses a circuit to relay 8EB (before it restores), opens the circuit to relay 8CF, opens the circuit to the first winding of relay 8CT, and removes the shunt from the second winding of relay 8FF. Relay 8FF operates and closes a circuit to relay 1S. Relay 1S operates and locks. Relays 8CT restores and transfers lead 7MM from resistance battery to ground.

Ground on lead 7MM is extended via lead 6M to the signal equipment, converted to battery by the signal equipment and applied to leads 5ED and 5ES at the remote end to short circuit relay 4DP. Correed relay 4DP restores and opens the circuit to relay 4EM. Relay 4EM restores, opens the circuit to relay 3EB, recloses the circuit to relay 3CF (before it restores), and closes the circuit to the first winding of relay 3CT and relay 2C2 in series. Relay 2C2 operates, locks, opens the circuit of relay 2CI and the second winding of relay 3FF, closes the lead P2 from the line equipment adapter to lead PH2 from the first horizontal level of the remote switching matrix. Relay 2CI restores and opens lead 11P1 from lead 16PH1. Relay 3CT operates and transfers lead 7MM from resistance battery to ground.

When relay 4EM again operates at the remote end and removes the holding ground from the first winding of relay 3FF, relay 3FF restores and prepares an operate path to counting chain relay 2C3.

The ground on lead 5M of the concentrator trunk at the remote end is converted to battery by the signal equipment and in turn applied to leads 6ED and 6ES of the concentrator trunk at the central office end. The counting chain operating sequence is controlled through this type of signalling (a series of on-hook, off-hook signals). This operating sequence occurs almost simultaneously at both sides of the line concentrator. The counting chain relays operate sequentially to identify the line circuit requesting service and to select the associated line equipment at the opposite end of the line concentrator. The alternate operation and restoration of relay 4DP, 7DP and 4EM, 7EM on both ends of the line concentrator controls the stepping of the associated counting chain relays. This sequence of operation continues until the line circuit requesting service is found (this sequence is always controlled by the originating side regardless of whether it be the remote or the central office end).

As the counting chain relay operates sequentially, each one of the P leads in the common equipment is momentarily connected to lead PH of the matrix. For example when counting chain relay 2C5 of the remote common equipment operates, the ground on lead 2P5 is closed to lead 2PH5 which is connected to the horizontal level 5 of the crosspoint matrix.

*Switch through of the remote end.*—Operated: Relays at both ends 1S, 10S, 2C1, 9C1, 3FF, 8FF, 3TM, 8TM, 3EB, 8EB, 4DS, 7DS, 4ATB, 7ATB, 4EM, 7EM, 4DP, 7DP, 5AG, 6AG, 5B, 6B; at the remote end 11L and 1OT; and at the central office end 10IN).

Assuming the first concentrator trunk is pre-allotted (relays 3DA, 3DB and 4DC not operated), battery via relay 4STP is present on the matrix vertical lead 5PV1 associated with the first concentrator trunk on the remote end via lead 4PS. Relay 4STP operates in series with the correed at the intersection of the first horizontal level and the first vertical group and the second winding of relay 11CO, and grounds lead 3STP to close a circuit to relay 5BF. Relay 11CO operates, locks in series with the "hold" winding of the correed in the matrix via its X contacts 11CO5, opens the circuit to the second winding of relay 11CO, the correed winding in the matrix used to "pull" and relay 4STP, grounds lead 11BL, closes the windings of 11LO in magnetic opposition, closes a circuit to the first winding of relay 5PO, opens the circuit to relay 1OT, grounds lead 11LT to close a circuit to relay 12LT. Relay 12LT operates and removes the idle line termination from across the line. Relay 5BF operates, locks, removes ground from lead 5ATB for a possible all trunks busy condition, and opens the circuit to the first windings of relays 5AG and 4DS. Relay 5PO operates and closes a circuit to relay 5POS. Relay 5POS operates.

*Release of the remote marker.*—(Operated: Relays at both ends 1S, 10S, 2C1, 9C1, 3FF, 8FF, 3TM, 8TM, 3EB, 8EB, 4DS, 7DS, 4ATB, 7ATB, 4EM, 7EM, 4DP, 7DP, 5AG, 6AG, 5B, 6B; at the remote end 11L, 11CO1 1OT, 4STP, 5BF, 5POS, 5PO, 12LT; and at the central office end 10IN).

Relay 5AG restores, removes ground from lead 4EM to open the circuit of relay 4DP, closes a circuit to relay 5E via ground on lead 5ED and opens lead 5PV from lead 4PS. Relay 5E operates, grounds lead 5ECV and closes a circuit to relay 5EG. Ground on lead 5ECV short circuits the first winding of relay 11LO, causing relay 11LO to operate, lock and open the circuit to its first winding, and ground lead 11ECH. After its slow to operate interval relay 5EG operates, locks and transfers the circuit of relay 5B to ground on lead 5ES. Relay 4DP restores and opens the circuit to the first winding of relay 4EM. Relay 1OT restores, closes a circuit to the second winding of relay 3CT, and removes ground from lead 11PB. Relay 4STP restores and opens the circuit to the second winding of relay 4EM. Relay 4EM restores, opens the circuit to relay 3EB and the second winding of relay 3CT, closes a circuit to the first winding of relay 3CT and 2C in series, and closes a circuit to relay 3CF. Relay 3CT operates and momentarily closes a circuit to relay 1IN. Relay 2C2 operates and opens the circuit to relay 2C1 and to the second winding of relay 3FF. Relay 3CF operates and closes a circuit to relay 4CB. Relay 4CB operates. Relay 2C1 restores and opens lead 11P1 from lead 13PH1. After its slow to release interval, relay 3EB restores and opens the circuits of relays 1S, 3CF, first winding of relay 3CT, 2C2 and first winding of relay 3FF. Relay 3CT restores and opens the circuit of relay 1IN. Relay 1S, 2C2 and 3FF restore. After its slow to release interval, relay 3CF restores and opens the circuit of relay 4CB. After its slow to release interval, relay 4CB restores and opens the circuit to the second winding of relay 4DS. Relay 4DS restores and allows the pre-allotting of the next idle trunk (see the section titled "Trunk Pre-Allotting").

*Switch through of the central office end.*—(Operated: Relays at both ends 8TM, 3TM, 7ATB, 4ATB, 6B, 5B; at the remote end 11L, 11LO, 11CO, 5E, 5BF, 5EG, 5POS, 5PO, 12LT; and at the central office end 10IN, 10S, 9C1, 8CT, 8CF, 8EB, 7DS, 7DP, 6AG).

The central office end of the line concentrator (operating simultaneously with the remote end) has operated to its counting chain relay 9C1. When relay 7EM operates, it opens the circuits of relay 8CF and the first winding of relay 8CT, recloses a circuit to relay 8EB, removes the shunt from the second winding of relay 8FF, and closes a circuit to relays 9C1 and the second winding of relay 8FF in series. Relay 8FF operates. After its slow to release interval, relay 8CF restores, opens the circuit of relay 7CB, transfers the holding ground of relay 8TM, and closes a circuit to relay 7STP via lead 7PS in series with the correed associated with the first vertical group and the fifth horizontal level in the matrix and the second winding of relay 17CO to ground on lead 10PA. Relay 17CO operates to its X contacts 17CO7, closes a circuit via its first winding to lead 16CH via the hold winding in the matrix and locks to ground on lead 6CV. Relay 7STP operates, closes a circuit to the second winding of relay 7EM, and grounds lead 6STP to close a circuit to relay 6BF. Relay 6BF operates, locks, removes ground from lead 6ATB for a possible all trunks busy condition, and opens the circuit to relay 6AG. When the pull is completed by the correed in the matrix, resistance ground on lead 16CH locks 17CO, which operates fully, opens the circuit to the first winding of relay 17CO, the pull winding of the correed in the matrix, and relay 7STP, grounds lead 17BT and 17LT to close circuits to relays 16BT and 16LT, respectively, and opens the busy tone supply circuit from leads 17TA and 17TB. Relays 16BT and 16LT operate. Relay 6AG restores, opens lead 6ED from lead 6EM opening the circuit to relay 7DP, closes a circuit for relay 6E to ground on lead 6ED and closes a circuit for relay 17DP and the first winding of relay 6SP in series and the second winding of relay 6SP in magnetic opposition, (relay 6SP will not operate at this time) opens lead 6PV from lead 7PS, and closes circuits for relays 6EG and 6BO. Relay 6E operates. Relay 17DP operates and closes a circuit to relay 17PI. Relay 17PI operates and closes lead 17SX to lead 17SX1 to close a simplex loop to the central office line circuit, and opens a circuit to its Number 2 winding. Relay 6EG operates, locks, and reopens the circuit of relay 6BO (before it operates). Relay 7DP restores.

When the connection is switched through the central office end, ground on leads 17A and 17C and battery on leads 17B and 17D from the central office line circuit closes a circuit for relay 17SZ. Relay 17SZ operates and closes a circuit to relay 17SZS. Relay 17SZS operates, closes low resistance 17R20 battery to lead 17EC, closes a circuit to relay 17LO, and grounds lead 16ECH to short circuit the first winding of relay 6SP via lead 6ECV. Relay 6SP operates on its Number 2 winding and closes a circuit to the second winding of relay 6HD. Relay 6HD operates, closes a locking ground to relay 6E, opens the circuit to the second winding of relay 6SP, removes the short circuit from the first winding of relay 6HD, to provide a locking circuit via the hold winding of the correed in the matrix and the first winding of relay 17CO, and transfer lead 6M from ground to resistance 6L battery. Relay 6SP restores and opens the circuit to the second winding of relay 6HD. After its slow to operate interval, relay 17LO operates, locks, removes ground from lead 16ECH, removes ground from lead 17BT to open the circuit of relay 16BT. Relay 16BT restores and removes the line termination and tone source from across the line.

*Release of the central office marker.*—(Operated: Relays at both ends 3TMS, 8TMS, 3TM, 8TM, 4ATB, 7ATB, 5E, 6E, 5EG, 6EG, 5BF, 6BF, 5B, 6B, 12LT, 15LT; at the remote end 11L, 11LO, 11CO, 5EG, 5POS, 5PO; and at the central office end 10IN, 10S, 9C, 8FF, 8CT, 8EB, 7STP, 7EM, 7DS, 6HD, 17LO, 17CO, 17DP, 17SZS, 17SZ, and 17P1).

Relay 7STP restores, opens the circuit to the second winding of relay 7EM, and removes ground from lead 6STP. Relay 7EM restores, opens the circuit of relay 8EB, and momentarily operates relays 8CF, first winding of relay 8CT and 9C2. Relay 9C2 operates and opens 9C1. Relay 8CF operates and closes a circuit to relay 7CB. Relay 7CB operates. Relay 9C1 restores and opens lead 17P1 from lead 16PH1. After its slow to release interval, relay 8EB restores and opens the circuit of relay 9C2, circuit to the first winding of relay 8CT, circuit to the first winding of relay 8FF, circuit to the second winding of relay 8CF, relay 10S and relay 10IN. Relays 9C2, 8CT, 8FF and 10S restore. Relay 10IN restores and removes ground from leads 10PA1 and 7B. After its slow to release interval, relay 8CF restores and opens the circuit to relay 7CB. After its slow to release interval, relay 7CB restores and opens the circuit to the second winding of relay 7DS. Relay 7DS restores to preallot the next idle trunk (see section titled "Trunk Pre-Allotting").

The common equipment restores to normal and is ready to process another request for service.

*Addressing.*—(Operated: Relays at both ends 3TMS, 8TMS, 3TM, 8TM, 4ATB, 7ATB, 5E, 6E, 5EG, 6EG, 5BF, 6BF, 5B, 6B, 12LT, 16LT; at the remote end 11L, 11LO, 11CO, 5POS, 5PO; and at the central office end 6HD, 17LO, 17CO, 7DP, 17SZS, 17SZ and 9P1).

Dial tone is returned after the central office line circuit has switched through. The M.F. pulses are sent over leads 12TA and 12RA or dial pulses are repeated by relay 11L over lead 11ECH to lead 5ECV to pulse relay 5PO. Relay 5PO pulses opening and closing 5POS, and places pulsing ground on lead 5M to the carrier equipment.

The ground pulses on lead 5M are converted to battery on leads 6ED and 6ES. Correed 17DP follows the pulses on lead 16ECH and pulses 17P1. Relay 17P1 follows the pulses and opens and closes leads 17SX and 17SX1 to transmit the pulses to the line circuit.

*Release.*—(Operated: Relays same as in preceding section).

When the remote party restores first, 11L is opened. Relay 11L restores and removes ground from lead 11ECH opening the circuit to the first winding of relay 5PO. Relay 5PO restores, opens the circuit to relay 5POS and transfers lead 5M from resistance battery to ground. Relay 5POS restores. Ground on lead 5M is transferred to battery by the signal circuit and battery is placed on leads 6ED and 6ES. Battery on lead 6ED short circuits 17DP. Relay 17DP restores and opens the circuit to the first winding of relay 17P1. Relay 17P1 restores, opens leads 17SX from lead 17SX1 to open the line relay circuit in the line circuit, and removes low resistance 17R20 ground from lead 17EC. Relay 17SZ circuit is opened by the line circuit, restores and opens the circuit to relay 17SZS. Relay 17SZS restores, opens the circuit to relay 17L0, and to the first winding of relay 17CO, the hold relay in the matrix and the first winding of relay 6HD. Relay 6HD restores, opens the circuit to relay 6EG, and transfers lead 6M from battery to ground. The hold relay in the matrix restores. Relay 17CO restores and momentarily closes a path to relay 16BT. Relay 17LO restores and opens the circuit of relay 16BT. Relay 6E restores and opens the circuit of relay 6B. After its slow to release interval, relay 6B restores and opens the circuits of relays 6BF and 6EG. Relay 6BF restores. Relay 6EG restores, opens the circuit to relay 15LT and grounds lead 6ATB. Relay 15LT restores. Ground on lead 6M is transferred to battery by the signal circuit and closed to leads 6ED and 6ES to short circuit relays 6E and 6B, respectively. Relay 6E restores. After its slow to release interval, 6B restores, opens the circuit to relay 6EG, and opens the circuit to relay 6BF. Relay 6BF restores and removes ground from lead 6CV to open the hold relay circuit in the remote matrix and the circuit to the first winding of relay 11CO. Relay 6EG restores, grounds lead 6ATB, and removes ground from lead 6LT to open the circuit to relay 15LT. Relay 15LT restores. The hold relay in the matrix restores. Relay 11CO restores, removes ground from lead 11LT to open the circuit to relay 12LT, removes ground from leads 11BL and 11OS, and opens the circuit to the second winding of relay 11LO. Relay 11LO restores. Relay 12LT restores and closes the idle line termination across the line. The circuit is now at normal.

When the central office party restores first release is as described in the section titled "Lockout," except the remote party restores opening 11L. Relay 11L restores, opens the circuit to the second winding of relay 11LO, and removes ground from lead 11ECH. Relay 11LO restores, recloses lead 11P to lead 1PA via the second winding of relay 11CO, and removes ground from lead 11BL.

*Call to remote end.*—When the line circuit at the central office end is seized, relay 17SZ operates via leads 17A, 17B, 17C and 17D, and closes a circuit to relay 17SZS. Relay 17SZS operates, closes resistance battery to lead 17EC to hold operated the preceding equipment and to provide a ring-hold signal to the connector, grounds lead 10ST of the common equipment, and closes lead 10PB to lead 17P through the second winding of relay 17CO.

The ground signal applied at lead 10ST closes a circuit to relay 10OT and the same sequence of events occur in the common equipment at the central office end of the line concentrator as described previously for the remote common equipment, except relay 6BO is closed instead of relay 6B when 10OT operates. The same counting chain sequences take place as described in the section titled "Seizure." When relay 10OT restores the circuit to relay 6BO is opened and if no lockout condition is found restores. Other than the reversal of common equipment functions, all operations are as described for calls from the remote end of the concentrator.

*Trunk pre-allotting.*—Trunk pre-allotting is accomplished at the same time through the concentrator trunks and their respective common equipment at both ends of the line concentrator. To simplify the description, only the functions at the remote side of the line concentrator are described.

Originally, when concentrator trunk 1 was pre-allotted, relays 7DS and 6AG had their circuits closed in series by ground on lead 6SN to common lead 4SN at the remote concentrator trunk, through the first winding of relay 5AG, back on lead 4AG to the common equipment and through the first winding of relay 7DS. When the subscriber's line was switched through the matrix, the circuit of relay 5BF is closed. Relay 5BF operates, opens the circuit of relay 5AG and through the first winding of relay 4DS. Relay 5AG restores and the operation is as described in the section titled "Release of the Remote Marker."

When both 4CB and 3EB restore the circuit to the second winding of relay 4DS is opened. Relay 4DS restores and closes a circuit to relay 3DA. After its slow to operate interval, relay 3DA operates, locks, prepares a circuit to relay 3DB, and closes a circuit to the first winding of relay 4DS and 5AG in series via lead 4AG to lead AG of the second concentrator trunk, through the first winding of relay 5AG to ground on lead 4SN. Relay 4DS operates and closes a locking circuit to 3DA. Relay 5AG operates, closes lead 5ED to 4EM, opens the circuit of relay 5E from lead 5ED, grounds lead 5CV, closes lead 5PV to lead 4PS, closes lead 4B to relay 5B, closes lead 5M to lead 5MM, and closes lead 3STP to relay 5BF.

Concentrator trunk 2 is thus pre-allotted and make ready to originate or receive signals over the E and M signal leads to process the next line circuit requesting service. Concentrator trunks at both ends are pre-allotted in the same manner.

Pre-allotting of trunks 3, 4 and 5 take place in the same manner as described above, except for trunk 3 relays 3DA and 3DB are both operated, for trunk 4 relays 3DA, 3DB and 4DC are operated and for trunk 5 relays 3DB and 4DC are operated.

*All trunks busy condition.* — When all concentrator trunks are busy (relay 5BF in each of the 5 concentrator trunks is operated), ground is removed from the common lead 5ATB opening the circuit to relay 4ATB. Relay 4ATB restores, opens the circuit to relay 3DA, 3DB and/or 4DC (if operated). The relay 4DS circuit is opened when both relays 3EB and 4CB restore and it will not operate again as long as the all trunks busy condition exists. At the central office side of the line concentrator's common equipment only, ground on lead 7OSG is extended to lead 17OS of the central office line circuits to busy out the remaining 5 line circuits (since all five of the high-usage trunks are busy, no other subscriber can receive or initiate a call). This ground marks the 5 unused line equipment adapters busy to calls from the central office end.

When all concentrator trunks are busy and one other than the first, for example the third, becomes idle, ground is reclosed to lead 6ATB closing a circuit to relay 7ATB. When trunk 3 restores, ground at the central office and from the contacts of relay 7SY through the first winding of relay 6AG is closed to lead AG of trunk 3. Relay 7ATB operates and closes a circuit to relay 8DA. Relay 8DA operates, locks and closes a circuit to relay 8DB. Relay 8DB operates, locks, closes a circuit to relay 7DC and closes the first winding of relay 7DS and the first winding of relay 6AG in series via lead AG. Relay 7DS operates and opens the circuit of relay 7DC before it operates. Relay 6AG operates, and closes lead 6ED to lead 6EM, grounds lead 6CV, closes lead 7PS to lead 6PV, and closes lead 6M to lead 7MM. Thus concentrator trunk 3 is pre-allotted and ready to process another line circuit requesting service.

*Trunk synchronization.*—The line concentrator includes a synchronizing circuit so that in the event that different concentrator trunks between the remote and central office ends are pre-allotted, this circuit will align or synchronize to two associated concentrator trunks. Assume the common equipment at the remote end of the line concentrator has pre-allotted trunk 2, and the common equipment at the central office end has pre-allotted trunk 1. With these (or similar unaligned) conditions existing, the following operation occurs.

Should relay 3DA be operated, an operating path for relay 5AG in the second concentrator trunk is provided via battery through relay 4DS on lead AG2. Relays 4DS, 5AG operate and pre-allot remote concentrator trunk 2.

Assuming that trunk 1 at the central office end is pre-allotted, relays 7DS and 6AG in the first concentrator trunk are operated. When a line circuit requests service (in this case, the request is originated at the central office end) the relay 17SZ circuit is closed. Relay 17SZ operates, closes a circuit to relay 17SZS. Relay 17SZS operates, grounds lead 10ST to close a circuit to relay 10OT and thermal delay relay 10GV, and closes high resistance 17R19 battery to lead 17EC. Relay 10OT operates and closes resistance battery to lead 7MM, which is extended to lead 6M of the signal equipment via relay contacts 6AG5. The battery potential on lead 6M is converted to ground by the signal equipment and applied to lead E of the remote concentrator trunk 1. Since the remote common equipment has pre-allotted concentrator trunk 2, relay 5AG in concentrator trunk 1 is unoperated. The ground on lead 5ED then closes a circuit to relay 5E. Relay 5E operates, grounds lead 5SY to close a circuit to relay 4SY. Relay 4SY operates, removes ground from lead 4SN opening the circuit to relay 5AG in concentrator trunk 2 and relay 4DS, and grounds lead 4SO. Since relay 5E is operated only in concentrator trunk 1, a path for ground at lead 4SO is completed through the second winding of relay 5AG and also the first winding over the lead 4AG and lead AG1. Relay 5AG restores.

When relay 4DS restores, it closes a circuit to relay 3DB. Since lead AG3 does not have ground appearing on it, relay 4DS does not operate and consequently, a circuit to relay 4DC is closed via ground from the contacts of relay 4ATB. Relay 4DC operates, opens the circuit to relay 3DA and closes the circuit to the first winding of relay 4DS to lead AG4. Since no ground appears on lead AG4 relay 4DS remains unoperated. Relay 3DA restores, closes a circuit to the first winding of relay 4DS to lead AG5, and opens the circuit to relay 4DC. Relay 4DS still remains unoperated because concentrator trunk 5 provides no ground at lead AG5. Relay 3DB restores and opens the circuit to relay 4DC. Relay 4DC restores, closes a circuit to relay 3DA, and closes a circuit to the first winding of relay 4DS to lead 4AG1. Relay 4DS operates in series with relay 5AG and opens the circuit to relay 3DA before it operates. Relay 5AG in the remote concentrator trunk 1 operates and prepares it to receive and send signals from and to concentrator trunk 1 at the central office end. The associated concentrator trunks on either end are thus synchronized and proceed to process line circuit requests for service.

*Lockout*. — (Operated: Relays at both ends 3TMS, 8TMS, 3TM, 8TM, 4ATB, 7ATB, 5E, 6E, 5EG, 6EG, 5BF, 6BF, 5B, 6B, 12LT, 16LT; at the remote end 11L, 11LO, 11CO, 5POS, 5PO; and at the central office end 6HD, 17LO, 17CO, 7DP, 17SZS, 17SZ and 9P1).

When the call is completed and the equipment released at the central office end relay 17SZ is opened. Relay 17SZ restores and opens the circuit to relay 17SZS. Relay 17SZS restores, removes resistance 17R20 ground from lead 17EC, opens lead 16CH from the first winding of relay 17CO thereby opening the circuit to the correed in the matrix to the first winding of relay 17CO, and opens the circuit to relay 17LO. Relay 6HD restores, transfers the circuit of relay 6E to ground on lead 6ED, and transfers lead 6M from resistance 6L battery to ground. Relay 17CO restores and momentarily closes a circuit to relay 16BT. Relay 17LO restores, opens the circuit to relay 16BT, and closes lead 10PA to lead 17P1 via the second winding of relay 17CO. The correed in the matrix restores and opens the circuit to relay 17DP. Correed 17DP restores and opens the circuit to the first winding of relay 17P1. Relay 17P1 restores.

The ground on lead 6M is converted to battery by the signal equipment and applied to lead 5ED and 5ES at the remote concentrator trunk short circuiting relays 5E and 5B, respectively. Relay 5E restores. After its slow to release interval, relay 5B restores and opens the circuit to relay 6EG and 6BF. Relay 6BF restores, recloses lead 6SN to lead 6AG via the first winding of relay 6AG, and removes ground from lead 6CV opening the circuit of the correed in the matrix and of the relay 11CO. Relay 11CO restores and transfers the holding circuit of relay 11LO to the contacts of relay 11L. The correed in the matrix releases and opens the circuit to the first winding of relay 5PO. Relay 5PO restores, opens the circuit to relay 5POS, and transfers lead 5M from resistance battery to ground. Relay 5POS restores. Relay 5EG restores, grounds lead 5ATB, and opens the circuit to relay 12LT. Relay 12LT restores.

Ground on lead 5M is transferred to battery at the central office end and short circuits relay 6E. Relay 6E restores and opens the circuit of relay 6B. After its slow to release interval, relay 6B restores and opens the circuit to relay 6EG and 6BF. Relay 6BF restores. Relay 6EG restores, opens lead 6LT, and grounds lead 6ATB. Relay 15LT restores. The matrix connections and concentrator trunks at both ends of the line concentrator release.

Since the subscriber at the remote end failed to disconnect, relay 11L and consequently relay 11LO remain operated, the subscriber's line is locked out.

Should an incoming call be attempted to the locked out line, relay 1LOR (via lead 11LOR), the correed in the matrix corresponding to the line circuit involved and the pre-allotted trunk, and relay 4STP (via lead 4PS) are closed in series. However, because of the high resistance of relay 1LOR, the correed and relay 4STP do not operate. Relay 1LOR operates, closes a circuit to relay 1LS, and closes a circuit to the second winding of relay 3CT. Relay 3CT operates and closes resistance 1L battery to lead 5MM, which is applied to lead 5M of the signal equipment. The signal equipment converts the battery to ground and applies it to lead E at the central office end.

Ground on lead E at the central office end closes a circuit to relay 6E. Relay 6E operates and closes a circuit to relays 6EG and 6BO in multiple. Relay 6BO operates. After its slow to operate interval, relay 6EG operates, locks, grounds lead 6LT, and opens the circuit to relay 6BO.

After its slow to operate interval, relay 1LS in the remote office operates, grounds lead 3STP to close a circuit to relay 5BF4 and opens the circuit to the second winding of relay 3CT. Relay 3CT restores and transfers lead 5MM from battery to ground. The signal equipment converts this ground to battery and applies it to leads 6ED and 6ES at the central office end.

Relay 6E restores and closes a circuit to relay 6RL. Relay 6RL operates and opens the circuit to the "hold" winding of the correed in the matrix, releasing the matrix connection. After its slow to release interval, relay 6BO restores and opens the circuit to relay 6RL. Relay 6RL restores.

Relay 17CO restores when the matrix connections are opened, closes the busy tone supply to leads 17TA and 17TB, and grounds lead 17BT to close a circuit to relay 16BT. Relay 16BT operates, to close busy tone back to the calling line, and closes the line termination across 17T1 and 17R1. The concentrator trunk at the central office end restores.

Ground on lead 3STP from the operated 1LS relay, causes the remote concentrator trunk to appear busy so as to cause the trunk pre-allotting circuit to step to the next idle trunk in synchronization with the central office end's trunk pre-allotting circuit.

*Call right of way.*—If an originating and terminating call seizes the respective markers simultaneously, time-out starts at both ends. Once one marker times out, the 1OT or 10OT relay circuit in that marker is opened, the 10OT relay restores and closes a circuit to the second winding of relay 3CT or 8CT, thereby giving the other marker's call "right of way."

*Over run.*—If a trunk is not found on the first cycle of the counting chain relays the eleventh pulse will close a circuit to the first winding of relay 10R. Relay 10R operates, locks, opens the circuit to relay 2C10, and grounds lead 3STP to close a circuit to relay 5BF or 6BF. Relay 5BF (or 6BF) operates and opens the circuit to relay 5AG (or 6AG). Relay 5AG (or 6AG) restores and after its slow to release interval, relay 3EB restores and opens the circuit to relays 3CF, second winding of relay 1OR and to relay 1S. Relay 1S restores. Relay 1OR restores and removes ground from lead 3STP opening the circuit to relays 5BF or 6BF. After its slow to release interval, relay 3CF restores and opens the circuit of relay 4CB. After its slow to release interval, relay 4CB restores and opens the circuit to the second winding of relay 4DS. Relay 4DS restores and steps to the next trunk as described.

*Time out.*—Assuming a call from the remote end; when the subscriber is off hook a circuit to relay 1L is closed via leads 11ST and 11SR. Relay 1L operates as described earlier, except before relay 3CF operates, slow to release relay 3TM restores and opens the circuit of relay 3TMS. Slow to release relay 3TMS restores, opens the circuit of relay 1OT, closes a circuit to the second winding of relay 4DS, and holds resistance 1L battery on lead 5MM. Relay 1OT restores, opens the circuit of relay 5B, removes ground from lead 11PB, and recloses a circuit to relay 3TM. Relay 5B restores. Relay 3TM operates and closes a circuit to relay 3TMS. Relay 3TMS operates, opens the circuit to the second winding of relay 4DS, and transfers lead 5MM from battery to ground. Relay 4DS restores to pre-allot the next idle trunk.

*Failure to complete call.*—If ground is not removed from lead 10ST before approximately 10 seconds, thermo relay 10GV operates and closes a circuit to relay 10SAL. Relay 10SAL operates, locks to lead 10ST, and opens the circuit of relay 10GV. Thermo delay relay 10GV restores and if ground is still on lead 10ST, closes a circuit to relay 10ALM via lamp 10SS. Relay 10ALM operates and grounds leads 10AP, 10MA and 10AR to signals as required. This condition will exist as long as ground remains on lead 10ST.

While I have described above the principles of my invention in connection with specific apparatus, it is to be clearly understood that this description is made only by way of example and not as a limitation to the scope of my invention.

What is claimed is:

1. An automatic communications switching system including:
   - a central switching office,
   - a plurality of subscribers' lines,
   - a plurality of trunks fewer in number than said lines for connecting said lines to said office,
   - remote switching means for connecting said lines to said trunks,
   - a first plurality of line terminations in said central office individual to said lines,
   - a second plurality of line terminations individual to said lines for connecting said lines to said remote switching means,
   - central switching means for connecting said first plurality of line terminations to said trunks,
   - remote and central control means connected to said remote and central switching means for operating said switching means,
   - selecting means in each of said control means for selecting an idle one of said trunks,
   - start means in each of said control means under the control of one of said line terminations at said subscriber lines to initiate the operation of said control means to step a line select means to a first step toward said line termination, select means at said central switching office, synchronizing means, said synchronizing means comprising a first circuit means at said remote line select means to complete a stepping circuit to said select means at said central switching office and open its own control means, said last means remaining open until said central office select means completes a corresponding step, and second circuit means at said central office select means to operate said first circuit means to reclose, said stepping alternately operated to step a corresponding line termination and a connect control means thereafter operated to operate said switching means to connect said line via said selected trunk and said two line termination equipments to said control switching office.

2. An automatic communications switching system including:
   - a central switching office,
   - a plurality of subscribers' lines,
   - a plurality of trunks fewer in number than said lines for connecting said lines to said office,
   - remote switching means for connecting said lines to said trunks,
   - a first plurality of line terminations in said central office individual to said lines,
   - a second plurality of line terminations individual to said lines for connecting said lines to said remote switching means,
   - central switching means for connecting said first plurality of line terminations to said trunks,
   - remote and central control means connected to said remote and central switching means for operating said switching means,
   - selecting means in each of said control means for selecting an idle one of said trunks,
   - start means in each of said control means under the control of one of said line terminations at said central office to initiate the operation of said associated control means to step a line equipment select means to a first step toward said line termination, select means at said remote control means, synchronizing means, said synchronizing means comprising a first circuit means at said central line select means to complete a stepping circuit to said select means at said remote control means and open its own control means, said last means remaining open until said remote office select means is operated a corresponding step, and second circuit means at said remote select means operated to close said first means, said stepping alternately operated to step a corresponding line select means to the corresponding line termination and a connect control means thereafter operated to operate said switching means to connect said line via said selected trunk and said two line termination equipments to said central switching office.

3. In a communication switching system as claimed in claim 1, wherein said lines comprise a first set of terminals, said trunks, a second set of terminals and said switching means is a switching stage for selectively electrically connecting terminals of the first set with terminals of the second set, said stage comprising a plurality of relays arranged in a coordinate array, a unidirectional device individual to each of said relays and connected in series with a winding thereof, at the coordinate points of said array, said connect control means in said control means operated after said line select means has selected an idle trunk to apply a second marking potential to a selected terminal of the second set which produces a potential difference in the forward direction of said devices between the two selected terminals through a series path including the winding of one coordinate point relay, which causes said relay in the path between the selected terminals to operate and thereby establish a communication path.

4. In a communication switching system as claimed in claim 2, wherein said lines comprise a first set of terminals, said trunks, a second set of terminals and said switching means in a switching stage for selectively electrically connecting terminals of the first set with terminals of the second set, said stage comprising a plurality of relays arranged in a coordinate array, a unidirectional device individual to each of said relays and connected in series with a winding thereof, at the coordinate points of said array, said connect control means in said control means operated after said line select means has selected an idle trunk to apply a second marking potential to a selected terminal of the second set which produces a potential difference in the forward direction of said devices between the two selected terminals through a series path including the winding of one coordinate point relay, which causes said relay in the path between the selected terminals to operate and thereby establish a communication path.

References Cited by the Examiner

UNITED STATES PATENTS

| | | | |
|---|---|---|---|
| 2,542,079 | 2/1951 | Grundin et al. | 179—18 |
| 3,096,402 | 7/1963 | McCreary | 179—18 |
| 3,121,141 | 2/1964 | Gohorel | 179—18 |

FOREIGN PATENTS

| | | |
|---|---|---|
| 755,407 | 8/1956 | Great Britain. |

KATHLEEN H. CLAFFY, *Primary Examiner.*

L. A. WRIGHT, *Assistant Examiner.*